(12) United States Patent
Kujak et al.

(10) Patent No.: US 10,214,670 B2
(45) Date of Patent: Feb. 26, 2019

(54) REFRIGERANT COMPOSITIONS AND METHODS OF USE

(71) Applicant: TRANE INTERNATIONAL INC., Davidson, NC (US)

(72) Inventors: Stephen A. Kujak, Onalaska, WI (US); Kenneth J. Schultz, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 201 days.

(21) Appl. No.: 14/938,991

(22) Filed: Nov. 12, 2015

(65) Prior Publication Data

US 2016/0130490 A1  May 12, 2016

Related U.S. Application Data

(60) Provisional application No. 62/078,251, filed on Nov. 11, 2014, provisional application No. 62/085,014, filed on Nov. 26, 2014, provisional application No. 62/085,019, filed on Nov. 26, 2014.

(51) Int. Cl.
*C09K 5/04* (2006.01)
*F25B 45/00* (2006.01)

(52) U.S. Cl.
CPC .............. *C09K 5/045* (2013.01); *F25B 45/00* (2013.01); *C09K 2205/126* (2013.01); *C09K 2205/22* (2013.01); *C09K 2205/40* (2013.01); *F25B 2400/121* (2013.01)

(58) Field of Classification Search
CPC ........ C09K 2205/122; C09K 2205/126; C09K 2205/32; C09K 205/34; F25B 45/00; F25B 2400/12
See application file for complete search history.

(56) References Cited

U.S. PATENT DOCUMENTS

| 4,220,011 | A | 9/1980 | Bergman et al. |
|---|---|---|---|
| 4,223,537 | A | 9/1980 | Sanborn |
| 7,421,855 | B2 | 9/2008 | Ring et al. |
| 7,556,482 | B2 | 7/2009 | Benco et al. |
| 7,819,644 | B2 | 10/2010 | Eber et al. |

(Continued)

FOREIGN PATENT DOCUMENTS

| EP | 1985680 | 10/2008 |
|---|---|---|
| WO | 2009/104784 | 8/2009 |

(Continued)

OTHER PUBLICATIONS

Notice of Allowance for U.S. Appl. No. 14/938,520 dated Sep. 20, 2016 (16 pages).

(Continued)

*Primary Examiner* — Elizabeth J Martin
(74) *Attorney, Agent, or Firm* — Hamre, Schumann, Mueller & Larson, P.C.

(57) ABSTRACT

Compositions and methods are described for reducing flammability in a heating, ventilation, and air conditioning (HVAC) system having R32 refrigerant included in the refrigerant composition. Refrigerant compositions and methods of use are described which can be used for retrofitting, servicing, controlling flammability, improving performance, lubricant solubility and miscibility, and improving the safety of an HVAC system.

10 Claims, 14 Drawing Sheets

(56) References Cited

U.S. PATENT DOCUMENTS

| | | | |
|---|---|---|---|
| 7,856,834 | B2 | 12/2010 | Haley |
| 7,914,698 | B2 | 3/2011 | Minor et al. |
| 8,011,196 | B2 | 9/2011 | Eber et al. |
| 8,132,420 | B2 | 3/2012 | Okoren et al. |
| 8,454,334 | B2 | 6/2013 | Heger et al. |
| 8,613,555 | B2 | 12/2013 | Benco et al. |
| 8,627,680 | B2 | 1/2014 | Haley et al. |
| 8,875,530 | B2 | 11/2014 | Foye et al. |
| 9,022,760 | B2 | 5/2015 | Bakkestuen et al. |
| 9,032,753 | B2 | 5/2015 | Love et al. |
| 9,032,754 | B2 | 5/2015 | Love et al. |
| 9,523,027 | B2 | 12/2016 | Minor |
| 9,540,556 | B2 | 1/2017 | Minor et al. |
| 9,556,372 | B2 | 1/2017 | Kujak et al. |
| 2010/0193155 | A1 | 8/2010 | Nakatani et al. |
| 2011/0100051 | A1 | 5/2011 | Edens et al. |
| 2011/0108756 | A1 | 5/2011 | Tsuchiya et al. |
| 2011/0146317 | A1 | 6/2011 | Cline et al. |
| 2013/0055738 | A1 | 3/2013 | Rached |
| 2013/0075069 | A1 | 3/2013 | Michael |
| 2013/0096218 | A1 | 4/2013 | Rached et al. |
| 2013/0145778 | A1 | 6/2013 | Yana Motta et al. |
| 2013/0283830 | A1 | 10/2013 | Jandal et al. |
| 2013/0283832 | A1 | 10/2013 | Kujak et al. |
| 2014/0102665 | A1 | 4/2014 | Sibik et al. |
| 2014/0137578 | A1* | 5/2014 | Yana Motta ............... F25B 1/00 62/77 |
| 2014/0191153 | A1 | 7/2014 | Motta et al. |
| 2014/0223927 | A1* | 8/2014 | Pottker ................. C09K 5/045 62/77 |
| 2014/0223936 | A1 | 8/2014 | Hartfield et al. |
| 2014/0224460 | A1 | 8/2014 | Means |
| 2014/0360210 | A1 | 12/2014 | Lapp et al. |
| 2015/0030489 | A1 | 1/2015 | Beekman et al. |
| 2015/0030490 | A1 | 1/2015 | Beekman et al. |
| 2015/0034284 | A1 | 2/2015 | Sullivan |
| 2015/0037184 | A1 | 2/2015 | Rood et al. |
| 2015/0037186 | A1 | 2/2015 | Smerud et al. |
| 2015/0037192 | A1 | 2/2015 | Smerud et al. |
| 2015/0093273 | A1 | 4/2015 | Johnson et al. |
| 2015/0192371 | A1 | 7/2015 | Hancock |
| 2015/0247658 | A1 | 9/2015 | Cosby et al. |
| 2015/0260441 | A1 | 9/2015 | Sibik |
| 2015/0276282 | A1 | 10/2015 | Heiden et al. |
| 2015/0276287 | A1 | 10/2015 | Cosby et al. |
| 2016/0215192 | A1 | 7/2016 | Minor et al. |
| 2016/0222272 | A1 | 8/2016 | Rached |

FOREIGN PATENT DOCUMENTS

| | | |
|---|---|---|
| WO | 2011141655 | 11/2011 |
| WO | 2015054104 | 4/2015 |

OTHER PUBLICATIONS

International Search Report and Written Opinion for PCT/IB2015/002276, dated Mar. 18, 2016 (10 pages).
Wu, J. et al., "Performance of mixture refrigerant R152a/R125/R32 in domestic air-conditioner" International Journal of Refrigeration, 2009, vol. 32, pp. 1049-1057, Abstract provided.
U.S. Office Action, dated Mar. 10, 2016; U.S. Appl. No. 14/938,520.
Extended European Search Report, European Patent Application No. 15858568.7, dated Oct. 11, 2017 (6 pages).

* cited by examiner

REFRIGERANT COMPOSITIONS AND METHODS OF USE

FIELD

The disclosure herein relates to refrigerant compositions, which can be used in, for example, refrigeration, air conditioning, and/or heat pump systems, which, for example, can be incorporated into a heating, ventilation, and air conditioning (HVAC) system or unit.

BACKGROUND

Concern about environment impact, e.g. ozone depletion, and the approval of the Montreal Protocol resulted in a movement to replace ozone depleting refrigerant compositions, such as for example, chlorofluorocarbons (CFCs) and hydrochlorofluorocarbons (HCFCs). As a result, replacement refrigerant compositions, such as for example hydrofluorocarbon (HFC) refrigerants and hydrofluoroolefins (HFOs) refrigerants are commercialized. However, HFC refrigerants may contribute to environment changes through their relatively large greenhouse effect, e.g. having a relatively large global warming potential (GWP).

SUMMARY

Compositions and methods are described for reducing flammability in a heating, ventilation, and air conditioning (HVAC) system, for example having R32 refrigerant included in the refrigerant composition. Refrigerant compositions and methods of use are described which can be used for retrofitting, servicing, controlling flammability, improving performance, lubricant solubility and miscibility, and improving the safety of an HVAC system.

In an embodiment, a method of reducing flammability of a refrigerant composition in an HVAC system includes adding a first refrigerant into the composition; adding a second refrigerant into the composition; and adding an amount of R125 refrigerant into the composition, the R125 refrigerant is relatively less flammable than the first refrigerant and the second refrigerant.

In an embodiment, the first refrigerant is R32 refrigerant and the second refrigerant is R1234yf refrigerant. In an embodiment, the percentage by weight of the R32 refrigerant, the R125 refrigerant, and the R1234yf refrigerant respectively ranges from 64.0 to 69.0, from 6.5 to 7.5, and from 25.5 to 28.5.

In an embodiment, the amount of R125 refrigerant ranges from 5.5 percent by weight to 7.5 percent by weight.

In an embodiment, the amount of R125 is such that the global warming potential (GWP) of the refrigerant composition is below the GWP of R32 refrigerant. In an embodiment, the refrigerant composition has a GWP of 675 or less.

In an embodiment, adding the first refrigerant includes adding a refrigerant with a relatively high capacity compared to the second refrigerant and the R125 refrigerant. In an embodiment, the adding the second refrigerant includes adding a refrigerant with a relatively low GWP compared to the first refrigerant and the R125 refrigerant.

In an embodiment, adding the first refrigerant, the second refrigerant, or the R125 refrigerant includes adding a refrigerant with a relatively high lubricant solubility compared to the other two refrigerants, and adding a lubricant, the lubricant comprises POE, PVE, polyester, or a combination thereof.

In an embodiment, a method of reducing flammability of a refrigerant composition in an HVAC system includes selecting a suitable amount of a non-flammable refrigerant, selecting a suitable amount of one or more refrigerants with a relatively low GWP compared to the non-flammable refrigerant, where the one or more refrigerants is relatively flammable compared to the non-flammable refrigerant, and mixing the non-flammable refrigerant and the one or more refrigerants with a relatively low GWP to obtain a resulting refrigerant composition. The resulting refrigerant composition achieves a desired performance characteristic in the HVAC system. The performance characteristic includes one or more thermodynamic properties of coefficient of performance (COP), capacity (CAP), a discharge temperature (Tdisch), or a combination thereof.

In an embodiment, a method of retrofitting a refrigerant composition in an HVAC system includes adding an amount of R125 refrigerant to a flammable refrigerant composition.

In an embodiment, the flammable refrigerant is one of a refrigerant blend of R32 refrigerant and R1234yf refrigerant respectively having a percentage by weight of 72.5 and 27.5, a refrigerant blend of R32 refrigerant and R1234yf refrigerant respectively having a percentage by weight of 68.9 and 31.1, or a refrigerant blend of R32 refrigerant and R1234yf refrigerant respectively having a percentage by weight of 36 and 64.

In an embodiment, the method of retrofitting further includes replacing an existing flammable refrigerant composition of the HVAC system with the composition resulting from adding the amount of R125 refrigerant to the flammable refrigerant composition.

In an embodiment, a method of servicing an HVAC system includes adding an amount of R125 refrigerant to a flammable refrigerant composition.

In an embodiment, a method of improving safety in an HVAC system includes adding an amount of R125 refrigerant to a flammable refrigerant composition.

In an embodiment, an HVAC system includes an operational refrigerant composition. The refrigerant composition includes R32 refrigerant, R125 refrigerant, and R1234yf refrigerant. The percentage by weight of the R32 refrigerant, the R125 refrigerant, and the R1234yf refrigerant respectively ranges from 64.0 to 69.0, from 6.5 to 7.5, and from 25.5 to 28.5.

In an embodiment, a method of recycling R410A refrigerant from a HVAC system includes removing existing R410A refrigerant from the HVAC system, and adding a refrigerant composition to the HVAC system. The refrigerant composition includes R32 refrigerant, R125 refrigerant, and R1234yf refrigerant. The percentage by weight of the R32 refrigerant, the R125 refrigerant, and the R1234yf refrigerant respectively ranges from 64.0 to 69.0, from 6.5 to 7.5, and from 25.5 to 28.5.

In an embodiment, a method of making a refrigerant composition includes selecting a suitable amount of a first refrigerant to address flammability of the refrigerant composition, selecting a suitable amount of a second refrigerant to address GWP of the refrigerant composition, selecting a suitable amount of a third refrigerant to address capacity of the refrigerant composition, and mixing the first, second, and third refrigerant.

DETAILED DESCRIPTION

Figure 1:
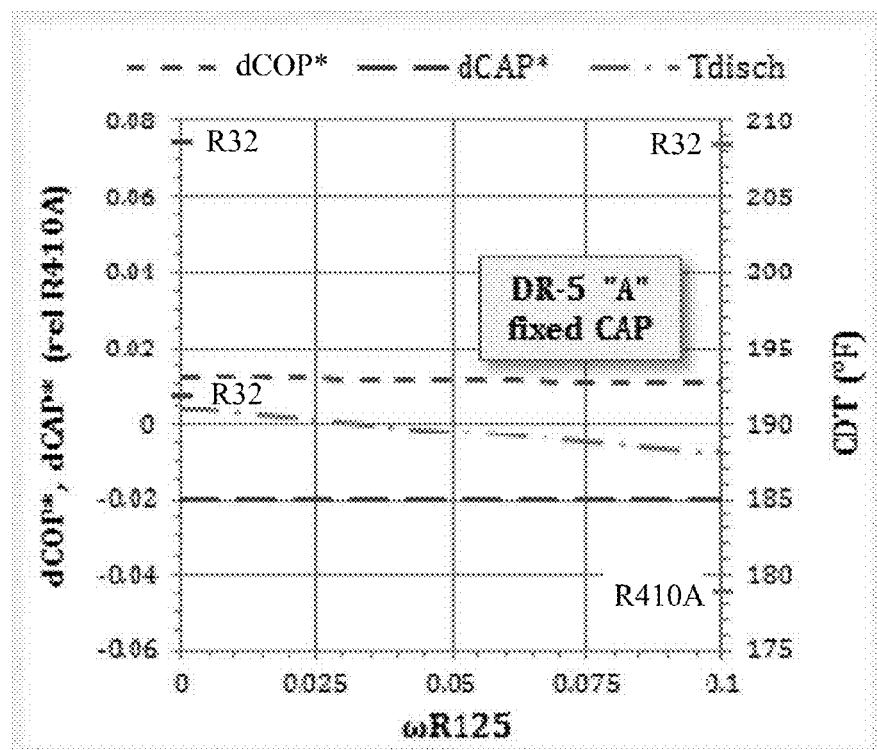
FIGS. 1-11 illustrate characteristics of various embodiments of refrigerant compositions with R125.

Some relatively low GWP HFCs, (e.g. R32, R152a) and ultra-low GWP HFOs (e.g., R123yf, R1234ze(E)) are mildly flammable, which may prevent the use of these low GWP refrigerants in a building HVAC system.

Embodiments as disclosed herein are directed to refrigerant compositions and methods to reduce flammability of a refrigerant or a refrigerant composition, e.g. a refrigerant composition of low GWP HFC R32 and/or an ultra-low GWP HFO R1234yf, by adding a non-flammable refrigerant (e.g. R125). The embodiments as disclosed herein may be used in refrigeration, air conditioning, and heat pump systems wherein the composition may include a fluoroolefin and at least one other component. In some embodiments, the other component may be, for example, a second fluoroolefin, hydrofluorocarbon (HFC), hydrocarbon, dimethyl ether, bis (trifluoromethyl) sulfide, $CF_3I$, or $CO_2$. The fluoroolefin compounds used in the refrigerant compositions, e.g. HFC-1225ye, HFC-1234ze, and HFC-1234ye, may exist as different configurational isomers or stereoisomers. The embodiments disclosed herein are intended to include all single configurational isomers, single stereoisomers or any combination or mixture thereof. For instance, 1,3,3,3-tetrafluoropropene (HFC-1234ze) is meant to represent the cis-isomer, trans-isomer, or any combination or mixture of both isomers in any ratio. Another example is HFC-1225ye, by which is represented by the cis-isomer, trans-isomer, or any combination or mixture of both isomers in any ratio.

The embodiments as disclosed herein are directed to optimize performance, flammability and GWP (e.g. minimizing the flammability and GWP without sacrificing the performance of the refrigerant compositions) of the refrigerant compositions. In some embodiments, refrigerant compositions including a flammable refrigerant composition including a low GWP HFC R32 and/or an ultra-low GWP HFO R1234yf, and a non-flammable refrigerant R125 are disclosed. The refrigerant compositions may have a lower flammability than the refrigerant including R32 and/or R1234yf, a GWP that is lower than R32, and similar performance characteristics as the refrigerant composition of R32 and/or R1234yf. In some embodiments, the refrigerant compositions herein, when used in a HVAC system, may have a slightly lower compressor discharge temperature and temperature glide than the refrigerant composition of R32 and/or R1234yf. In some embodiments, an operational pressure in a HVAC system using the refrigerant compositions as disclosed herein can be lower than a HVAC system using R410A or R32. The refrigerant compositions disclosed herein may be used in a HVAC system to replace low GWP refrigerants, e.g. R410A and R404A. The embodiments as disclosed herein may be used with other flammable refrigerants to reduce flammability, other high GWP refrigerants to reduce GWP, and/or other low capacity refrigerants to increase capacity.

In some embodiments, a method of reducing flammability in a HVAC system with a non-flammable refrigerant (e.g. R125) is disclosed. In some embodiments, a method of retrofitting a HVAC system that has a flammable refrigerant is disclosed. In some embodiments, a method of servicing a HVAC system to reduce flammability of the refrigerant in the HVAC system is disclosed. In some embodiments, a method of improving safety of a HVAC system is disclosed. In some embodiments, a method of controlling a HVAC system to reduce flammability is disclosed. In some embodiments, a method of additional control (e.g. control of the flammability) to the HVAC system is provided. In some embodiments, a method of improving lubricant solubility, miscibility and/or performance in a HVAC system is provided. In some embodiments, a method of recycling low GWP refrigerant R410A from a HVAC system is provided.

A method of reducing flammability of a refrigerant composition may include adding a non-flammable refrigerant to the refrigerant composition. In one embodiment, flammability of a refrigerant compositions including a low GWP HFCs, e.g. (R32, R152a) and/or a ultra-low GWP HFOs (R123yf, R1234ze(E)) may be reduced by adding a non-flammable refrigerant (e.g. R125). In some embodiments, up to, at, or about 5.5% wt of R125 may be added into a refrigerant composition including R32 and/or R1234yf, without the final GWP of the refrigerant composition exceeding the GWP of R32. In some embodiments, up to, at, or about 7.5% wt of R125 may be added into a refrigerant composition including R32 and/or R1234yf.

A method of reducing flammability of a refrigerant composition may include adding a non-flammable refrigerant to a relatively flammable refrigerant composition to reduce the flammability of the refrigerant composition. In some embodiments, the non-flammable refrigerant may be R125. In some embodiments, the amount of non-flammable refrigerant (e.g. R125) can be added up to, at, or about 7.5% wt. In some embodiments, the relatively flammable refrigerant composition may be 72.5% wt R32 and 27.5% wt R1234yf, which is marketed as DR-5 by Dupont®, or may be 68.9% wt R32 and 31.1% wt R1234yf, which is marketed as DR-5A by Dupont®. In some embodiments, the relatively flammable refrigerant can be other suitable refrigerants, some of which can be found in U.S. Pat. No. 7,914,698, which is incorporated by reference in its entirety herein. In some embodiments, the relatively flammable refrigerant may be DR-5A (68.9% wt R32/31.1% wt R1234yf), DR-7 (36% wt R32/64% wt R1234yf), DR-4, or DR-3, which are marketed by Dupont®.

In some embodiments, the method of reducing flammability of a refrigerant composition may include balancing performance characteristics, flammability and GWP of the refrigerant composition (e.g. minimizing flammability, minimizing GWP and maximizing performance characteristics). In some embodiments, the method of reducing flammability of a refrigerant composition may include adding a non-flammable refrigerant (e.g. R125) to a relatively flammable refrigerant composition so that the resulting refrigerant composition can match a design requirement (e.g. flammability of the refrigerant) of a HVAC system.

A method of making a refrigerant for a HVAC system may include combining suitable amounts of a plurality of refrigerants, so that the resulting refrigerant composition may match a design requirement (e.g. desired properties of the refrigerant) of a HVAC system. In some embodiments, the method of making a refrigerant for a HVAC system may include selecting a non-flammable refrigerant (e.g. R125), and selecting one or more refrigerants with a relatively low GWP (e.g. R32 and/or R1234yf), and mixing the non-flammable refrigerant and the one or more refrigerants with a relatively low GWP. In some embodiments, the method of making a refrigerant for a HVAC system may include blending a suitable amount of the non-flammable refrigerant and the one or more refrigerants with a relatively low GWP, so that a desired performance characteristic of the resulting refrigerant composition in a HVAC system may be achieved. In some embodiments, the performance characteristic (e.g. thermodynamic properties) may be a coefficient of performance (COP), capacity (CAP), a compressor discharge temperature (Tdisch), or a combination of one or more of these characteristics. In some embodiments, the performance characteristic(s) of the resulting refrigerant composition may be simulated and/or estimated by an Excel-based thermodynamic cycle calculation tool, such as for example NIST's REFPROP program. In some embodiments, a burn velocity (BV, cm/sec) may be simulated and/or estimated by an Excel-based thermodynamic cycle calculation tool, such as for example NIST's REFPROP program.

Figure 12:
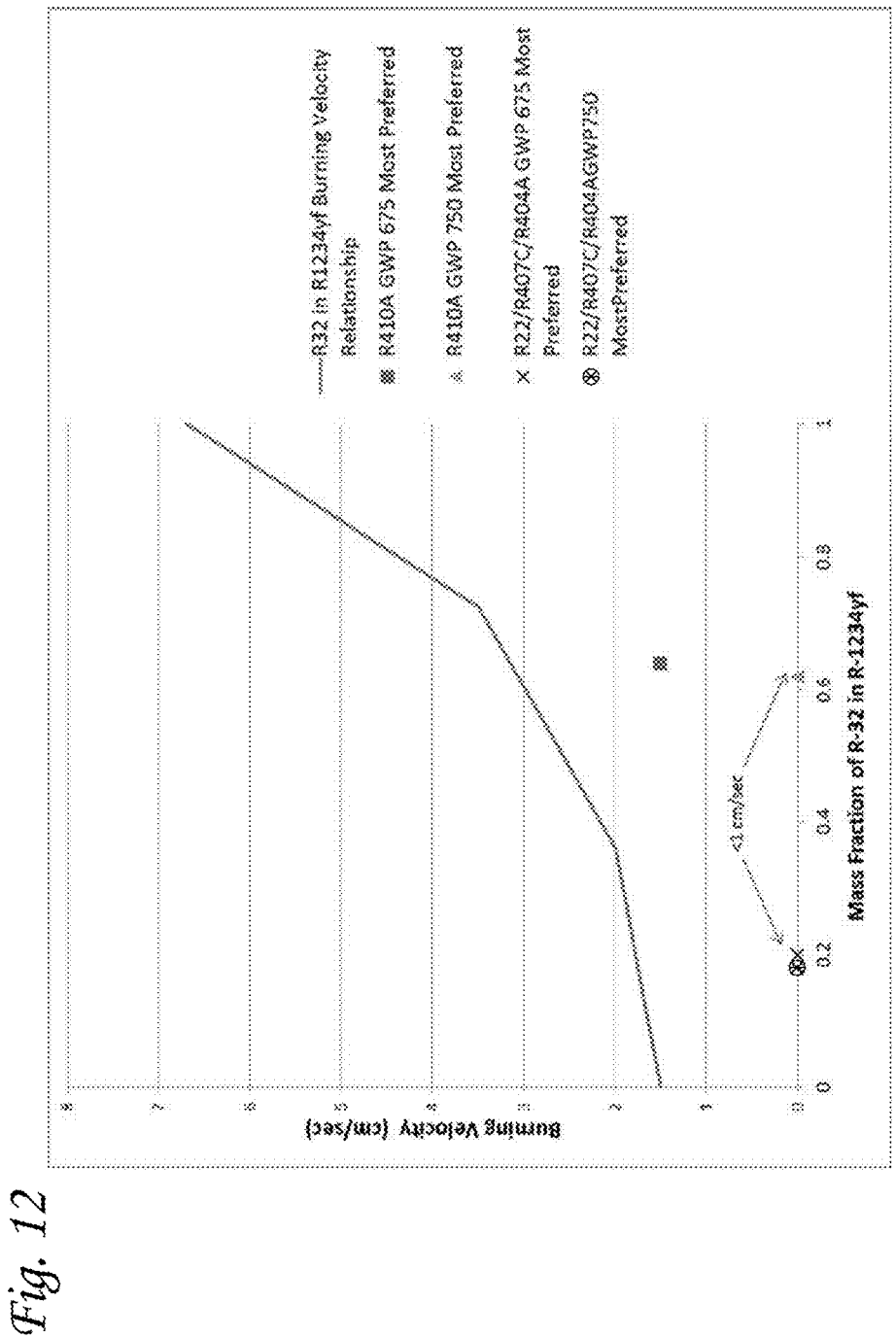
FIG. 12 illustrates burning velocity (BV) of various refrigerant compositions.

In some embodiments, a refrigerant composition including R32 and R1234yf has an increasing BV (e.g. flammability) may have a correlation with an increasing % wt of R32 in the refrigerant composition. (See for example FIG. 12) In some embodiments, the flammability of the refrigerant composition can be reduced by adding R125 to the refrigerant composition.

In some embodiments, R125 may be added to DR-5 and/or DR-5A to reduce the flammability of DR-5 and/or DR-5A. In some embodiments, the compositions of R32 and R1234yf can be adjusted to maintain a fixed capacity as R125 is added. (See for example FIG. 1). In some embodiments, the R125 can be added in a suitable amount, so that the resulting refrigerant composition has a GWP that is the same or similar to R32. (See for example FIG. 1). The composition (e.g. % wt) of the R32 and R1234yf in the resulting refrigerant composition may be further adjusted to meet performance characteristics. The resulting refrigerant composition can be used to replace R410A in a HVAC system. FIG. 1 is further described below.

Figure 8:
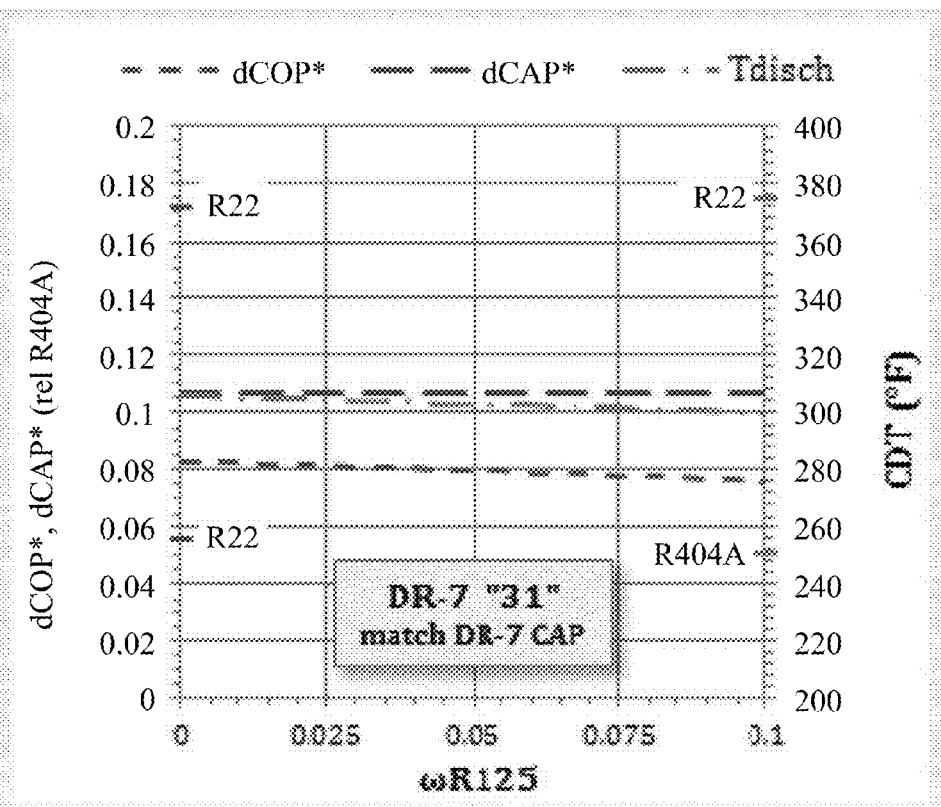

In some embodiments, R125 may be added to DR-7 to reduce the flammability of DR-7. In some embodiments, the compositions of R32 and R1234yf can be adjusted to maintain a fixed capacity as R125 is added. (See for example FIG. 8). In some embodiments, the R125 can be added in a suitable amount, so that the resulting refrigerant composition has a GWP that is the same or similar to R32. (See for example FIG. 8). The composition (e.g. % wt) of the R32 and R1234yf in the resulting refrigerant composition may be further adjusted to meet performance characteristics. The resulting refrigerant composition can be used, for example, to replace R404A in a HVAC system. FIG. 8 is further described below.

A method of reducing flammability of a HVAC system may include adding non-flammable refrigerant to a current refrigerant in the HVAC system. In some embodiments, R125 may be added to the current refrigerant in the HVAC system to reduce the flammability of the HVAC system. In some embodiments, the current refrigerant in the HVAC system may include R32. In some embodiments, the current refrigerant in the HVAC system may be 72.5% wt R32 and 27.5% wt R1234yf, which is sold commercially as DR-5 by Dupont®. In some embodiments, the current refrigerant can be other suitable refrigerants, some of which can be found in U.S. Pat. No. 7,914,698. In some embodiments, the amount of non-flammable refrigerant (e.g. R125) can be added up to or about 7.5% wt. It is to be noted that the methods as disclosed herein may be used to retrofit and/or service an existing HVAC system having a flammable refrigerant. The methods as disclose herein can also be used to increase safety in a HVAC system, e.g. reducing flammability of the HVAC system. The methods as disclose herein can also provide a method of controlling the HVAC system to, for example, reduce flammability of the HVAC system.

In some embodiments, a refrigerant (e.g. R410A) in the HVAC system may be replaced with the refrigerant compositions as disclosed herein, without the need of modifying the HVAC system (e.g. structures, circuit design, or control). In some embodiments, the refrigerant replaced (e.g. R410A) can be recycled to be used in another low GWP HVAC system.

Often replacement refrigerants are most useful if capable of being used in the original refrigeration equipment designed for a different refrigerant. The refrigerant compositions disclosed herein may be useful as replacements in original equipment.

In some embodiments, one or more refrigerant with different properties (e.g. flammability, lubricant solubility, miscibility, and performance characteristics) may be blended in a suitable amount, so that a resulting refrigerant composition may meet desired properties. In some embodiments, one or more non-flammable refrigerants can be added to achieve desired flammability in the resulting refrigerant. In some embodiments, one or more lubricant compatible (e.g. solvable) refrigerants can be used to achieve desired lubricant solubility in the resulting refrigerant.

A method of making a refrigerant composition with desired properties may include blending a suitable amount of one or more refrigerants, each of which may have different properties. The consideration of the desired properties of the refrigerant composition may include flammability, GWP, capacity, and/or lubricant solubility. In some embodiments, the method may include adding a refrigerant with a relatively low flammability (e.g. R125) to the refrigerant composition to reduce the flammability of the refrigerant composition. In some embodiments, the method may include adding a refrigerant with a relatively low GWP (e.g. R1234yf) to the refrigerant composition to reduce the GWP of the refrigerant composition. In some embodiments, the method may include adding a refrigerant with a relatively high capacity (e.g. R32) to the refrigerant composition to increase the capacity of the refrigerant composition. In some embodiments, the method may include adding a refrigerant with a relatively high lubricant solubility (e.g. R125) to the refrigerant composition to increase the lubricant solubility of the refrigerant composition. The lubricant may be, for example, POE, PV, polyester, or a combination thereof.

In some embodiments, the properties (e.g. GWP and/or capacity) of the refrigerant compositions herein may be made to resemble or match an existing refrigerant (e.g. R410A, R22, and/or R404A), so that the refrigerant composition can be used to replace (e.g. drop in) the existing refrigerant. In some embodiments, the refrigerant composition may be used to replace the existing refrigerant in a HVAC system. The replaced refrigerant may be reclaimed and/or repurposed to other applications. In some embodiments, the refrigerant composition may be used in a HVAC system with a screw compressor, a scroll compressor, a reciprocating compressor or other suitable compressors.

Generally, a refrigerant composition as disclosed herein may include suitable amounts of different refrigerants, each of which is selected to help achieve at least one property of the refrigerant composition. In some embodiments, the refrigerant composition may include a suitable amount of a first refrigerant that is selected to address (e.g. reduce) flammability of the refrigerant composition, a suitable amount of a second refrigerant that is selected to address (e.g. reduce) GWP of the refrigerant composition, and a suitable amount of a third refrigerant that is selected to address (e.g. increase) capacity of the refrigerant composition. It is to be noted that in some embodiments, one refrigerant may be able to address more than one property of the refrigerant composition.

Lower Alternatives to R410A and R404A with Improved Properties

Tests showing the impact of adding certain amounts of R125 refrigerant, for example to binary blends of R32 refrigerant and R1234yf refrigerant are described below with reference to FIGS. 1 to 11. Adding some amount of R125to blends, such as for example DR-5, DR-5A, and DR-7 (and DR-3 and DR-4), can be beneficial in decreasing flammability of the blend (e.g. decreasing burn velocity). Some amount of the GWP may increase but may still be maintained lower than R32 refrigerant. Results reported and illustrated in the graphs of FIGS. 1 to 11 are summarized below, and were obtained using an Excel-based thermodynamic cycle calculation tool in relation to the known NIST's REFPROP program for estimating thermodynamic properties of refrigerants.

1. Adding R125 to R410A and R410A Alternatives.

Figure 2:
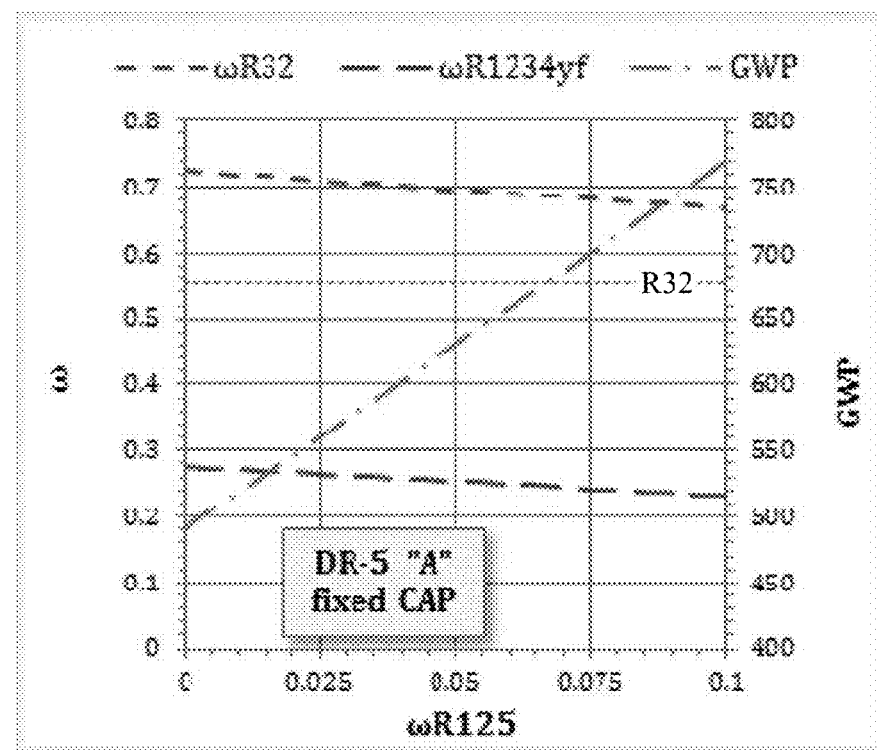

With reference to FIGS. 1 and 2, DR-5 (72.5% wt R32/27.5% wt R1234yf) by DuPont® had been previously proposed as an alternative to R410A, as it had comparable performance relative to R410A, by way of having similar capacity and coefficient of performance with a modest rise in compressor discharge temperature. For example, performance of a unitary air conditioning unit operating are predicted at conditions representing AHRI (Air-Conditioning, Heating, and Refrigeration Institute) standard AHRI-Std-210/240 "A" rating point as R125 is added.

FIG. 1 shows variation in performance as R125 is added to DR-5 blend at AHRI Std-210/240 "A" rating point. FIG. 2 shows the variation in composition as R125 is added to DR-5 blend at AHRI Std 210/240 "A" rating point. In these simulations, the composition of R32/R1234yf is adjusted to maintain a fixed capacity as R125 is added. FIG. 2 shows that up to 6.5% R125 can be added while keeping GWP less than R32 (677). FIG. 1 indicates that COP decreases very slightly as R125 is added, remaining about 1% higher than R410A. The capacity of DR-5 and the blends with R125 are lower than R410A by about 2%. Another benefit of adding R125 is a slight reduction in compressor discharge temperature.

Figure 3:
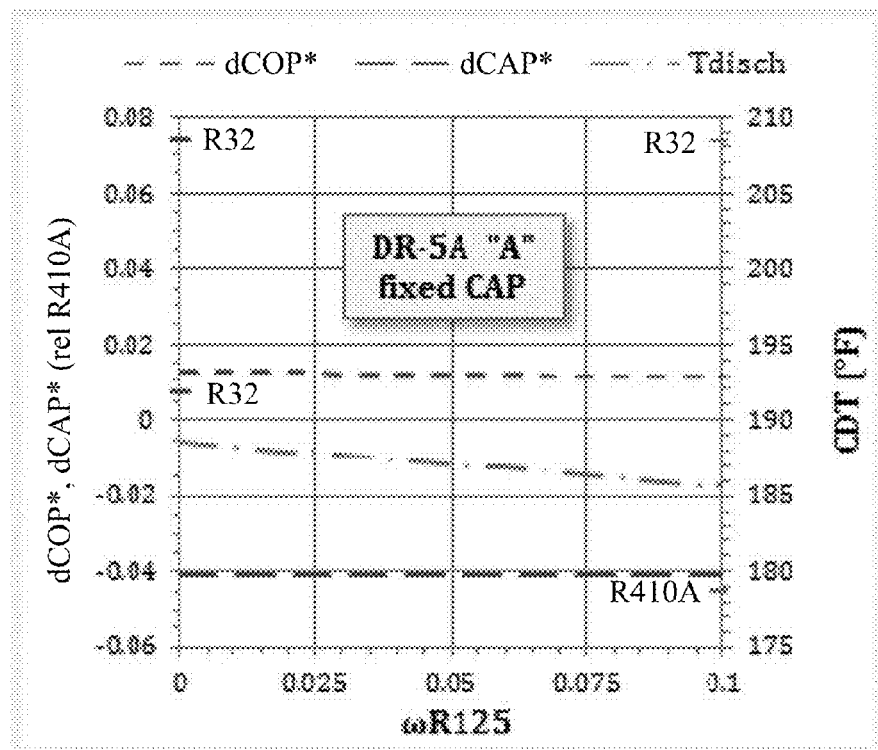
Figure 4:
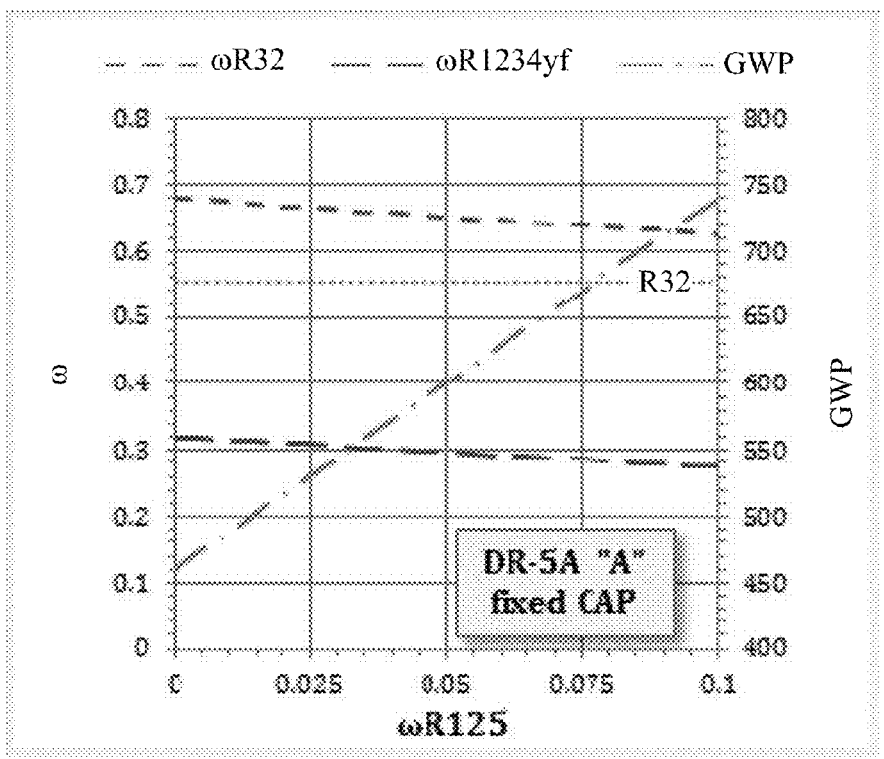

With reference to FIGS. 3 and 4, DR-5A (68% wt R32/32% wt R1234yf) by DuPont® was another potential R410A alternative. The higher R1234yf content lowers the capacity of this blend ~2% relative to DR-5 and ~4% relative to R410A, but also reduces the compressor discharge temperature and can reduce the burning velocity. For example, performance of a unitary air conditioning unit operating are predicted at conditions representing AHRI (Air-Conditioning, Heating, and Refrigeration Institute) standard AHRI-Std-210/240 "A" rating point as R125 is added. The predicted impacts on performance at the "A" rating condition are shown in FIGS. 3 and 4.

FIG. 3 shows the variation in performance as R125 is added to DR-5A blend at AHRI Std-210/240 "A" rating point. FIG. 4 shows the variation in composition as R125 is added to DR-5A blend at AHRI Std-210/240 "A" rating point. In these simulations, the composition of R32/R1234yf is again adjusted to maintain a fixed capacity as R125 is added. FIG. 4 shows that up to 7.5% R125 can be added while keeping GWP less than R32 (677). FIG. 3 indicates that COP decreases very slightly as R125 is added, remaining about 1% higher than R410A. The capacity of DR-5A and the blends with R125 are lower than R410A by about 4%. As above, adding R125 results in a slight reduction in compressor discharge temperature.

Figure 5:
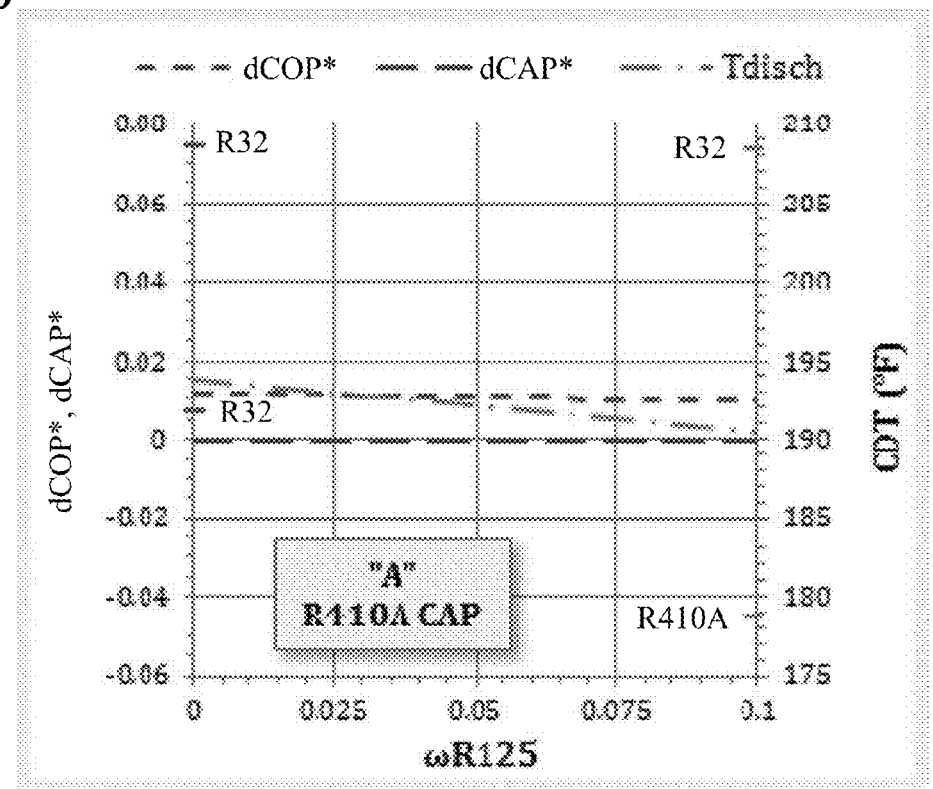
Figure 6:
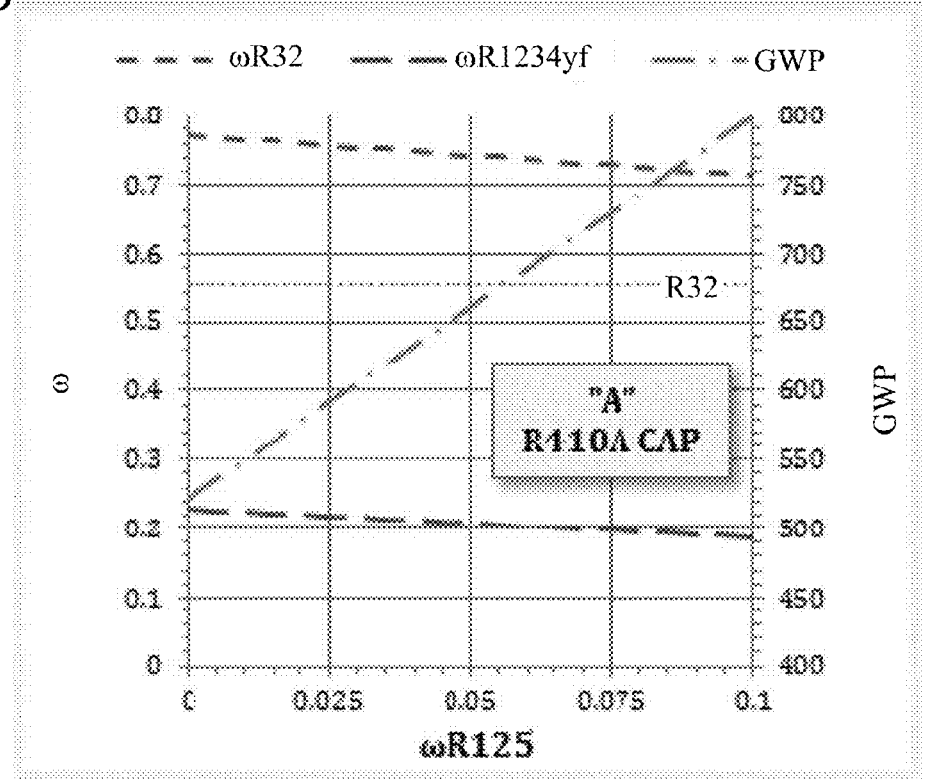

The small shortfall in capacity of DR-5 and DR-5A relative to R410A can be made up by increasing the portion of R32 in the blend to 77.2% wt. FIGS. 5 and 6 show the predicted impact on performance of adding small amounts of R125 to the starting blend R410A.

FIG. 5 shows the variation in performance as R125 is added to blend matching R410A capacity at AHRI Std-210/240 "A" rating point. FIG. 6 shows the variation in composition as R125 is added to blend matching R410A capacity at AHRI Std-210/240 "A" rating point. In these simulations, the composition of R32/R1234yf is again adjusted to maintain a fixed capacity as R125 is added. FIG. 6 shows that up to 5.5% R125 can be added to the starting R32/R1234yf blend while keeping GWP less than R32 (677). FIG. 5 indicates that COP decreases very slightly as R125 is added, remaining about 1% higher than R410A and just slightly above R32. The blend is designed to match R410A's capacity rather than accept R32's ~7.5% higher capacity. As above, adding R125 results in a slight reduction in compressor discharge temperature.

Figure 7:
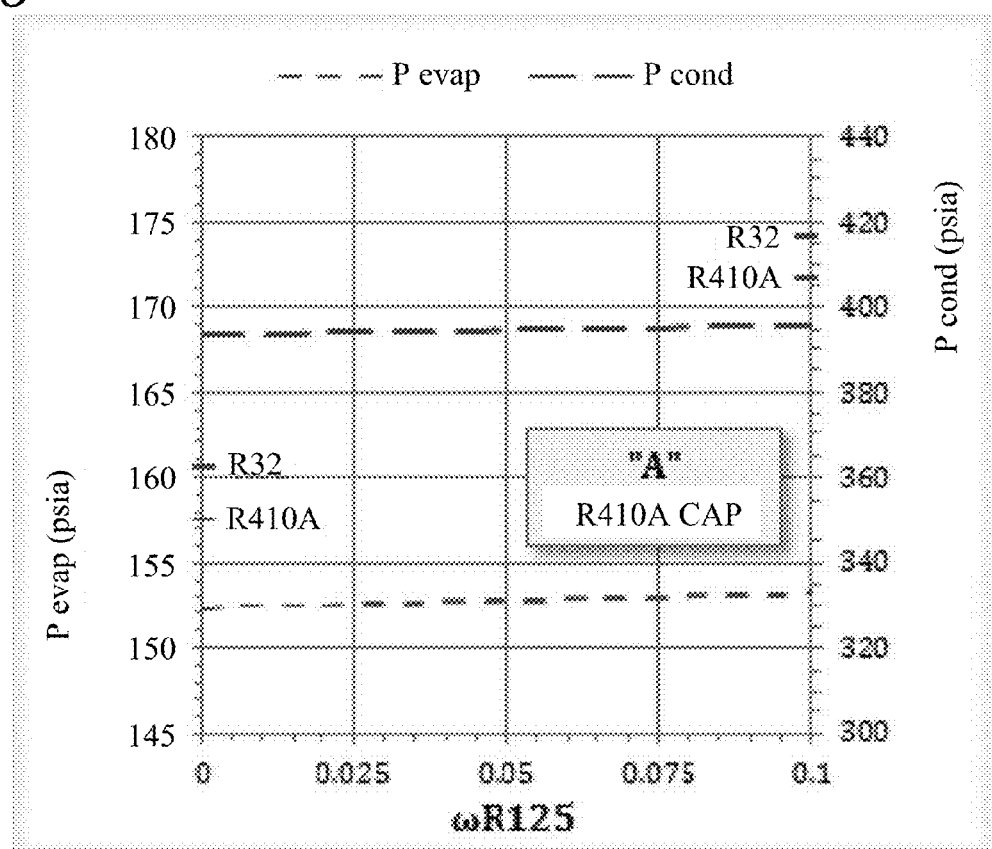

FIG. 7 shows variation in operating pressures as R125 is added to blend matching R410A capacity at AHRI Std-210/240 "A" rating point. FIG. 7 indicates that operating pressures increase as R125 is added to the R32/R1234yf blend. However, both the evaporator and condenser pressures remain below the pressures for R410A and R32. The starting R32/R1234yf blends for R410A capacity matching, DR-5, and DR-5a exhibit relatively small temperature glides of ~1.5° Fd, ~2.1° Fd, and ~2.7° Fd, respectively. Adding R125 to such blends tends to decrease the temperature glide slightly (at or about 0.1. to at or about 0.2° Fd).

2. Adding R125 to R404A and R404A Alternatives.

Figure 9:
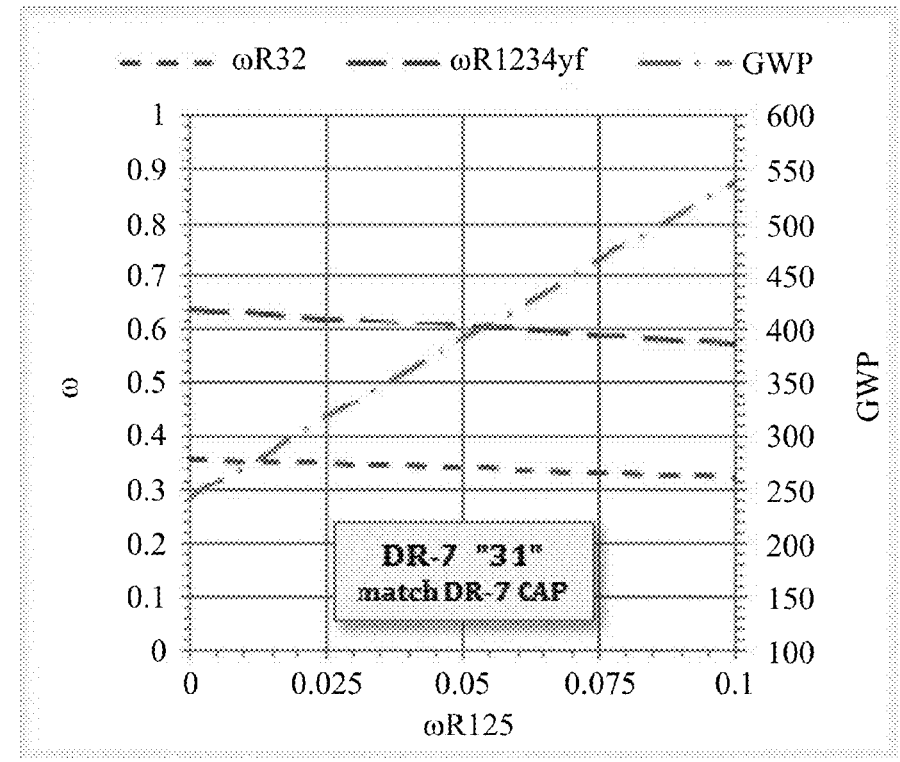

DuPont proposed DR-7 (36% wt R32/64% wt R1234yf) as a low GWP alternative to R404A in refrigeration applications. DR-7 already has a lower burning velocity than DR-5/5A because of its lower R32 content. However, addition of R125 can further reduce the flammability. FIGS. 8 and 9 show the impact of adding R125 to DR-7 when operating at the "Transport #1" condition (−30° F. evaporator/114° F. condenser). As above, the R32/R1234yf composition is adjusted to maintain capacity of DR-7.

FIG. 8 shows the variation in performance as R125 is added to DR-7 at the "Transport #1" condition. FIG. 9 shows the variation in composition as R125 is added to DR-7 at the "Transport #1" condition. In the simulations, DR-7 is seen to offer ~10% more capacity than R404A at this condition and ~8% higher COP. Adding R125 results in a very slight decrease in COP and compressor discharge temperature. One impact is the potential reduction in flammability for a modest increase in GWP. DR-7 has a condenser temperature glide of 9.2° Fd at this condition. Adding R125 causes the temperature glide to increase by ~0.5° Fd at 5% R125.

Figure 10:
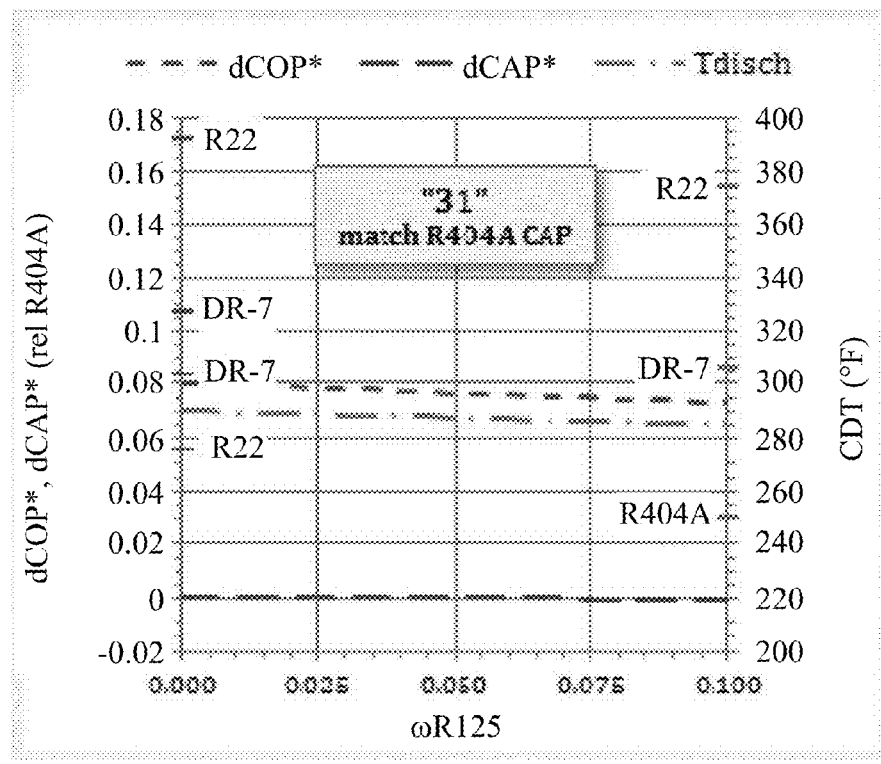
Figure 11:
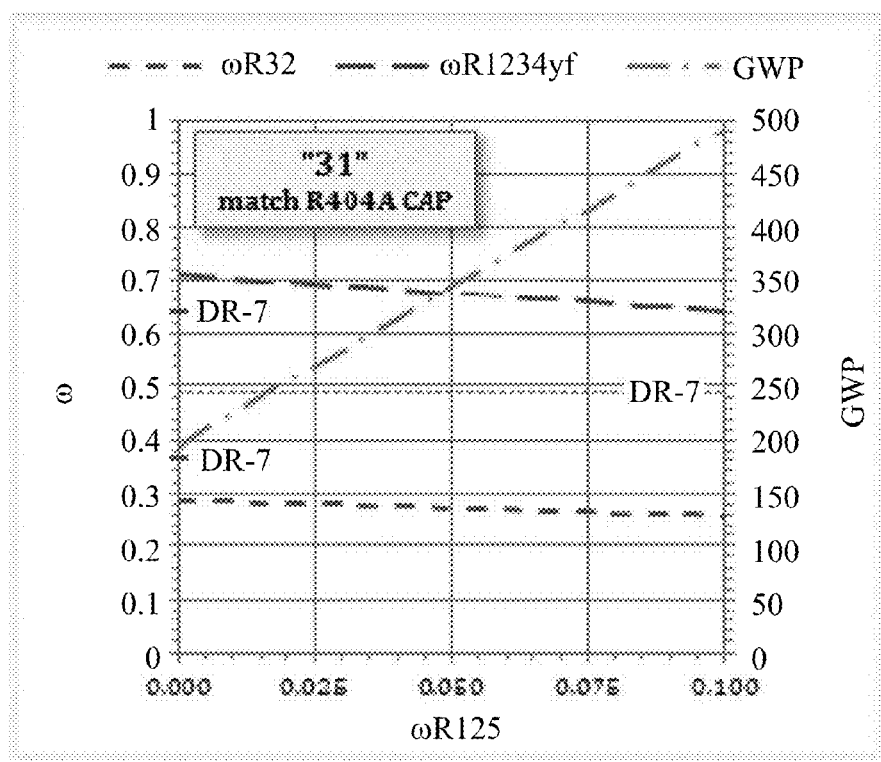

By further reducing the R32 content, a blend can be made that matches the capacity of R404A at the "Transport #1" condition (29% wt R32/71% wt R1234yf). This can potentially lower flammability. COP is still 7%-8% higher than R404A, decreasing slightly as R125 is added. Only about 1.5% R125 is added to the blend before surpassing the GWP of DR-7. However, GWP for these R32/R1234yf/R125 blends are much lower than for R404A. FIG. 10 shows the variation in performance as R125 is added to a blend matching R404A capacity at the "Transport #1" condition. FIG. 11 shows the variation in composition as R125 is added to a blend matching R404A capacity at the "Transport #1" condition.

FIGS. 13 to 19

Figure 13:
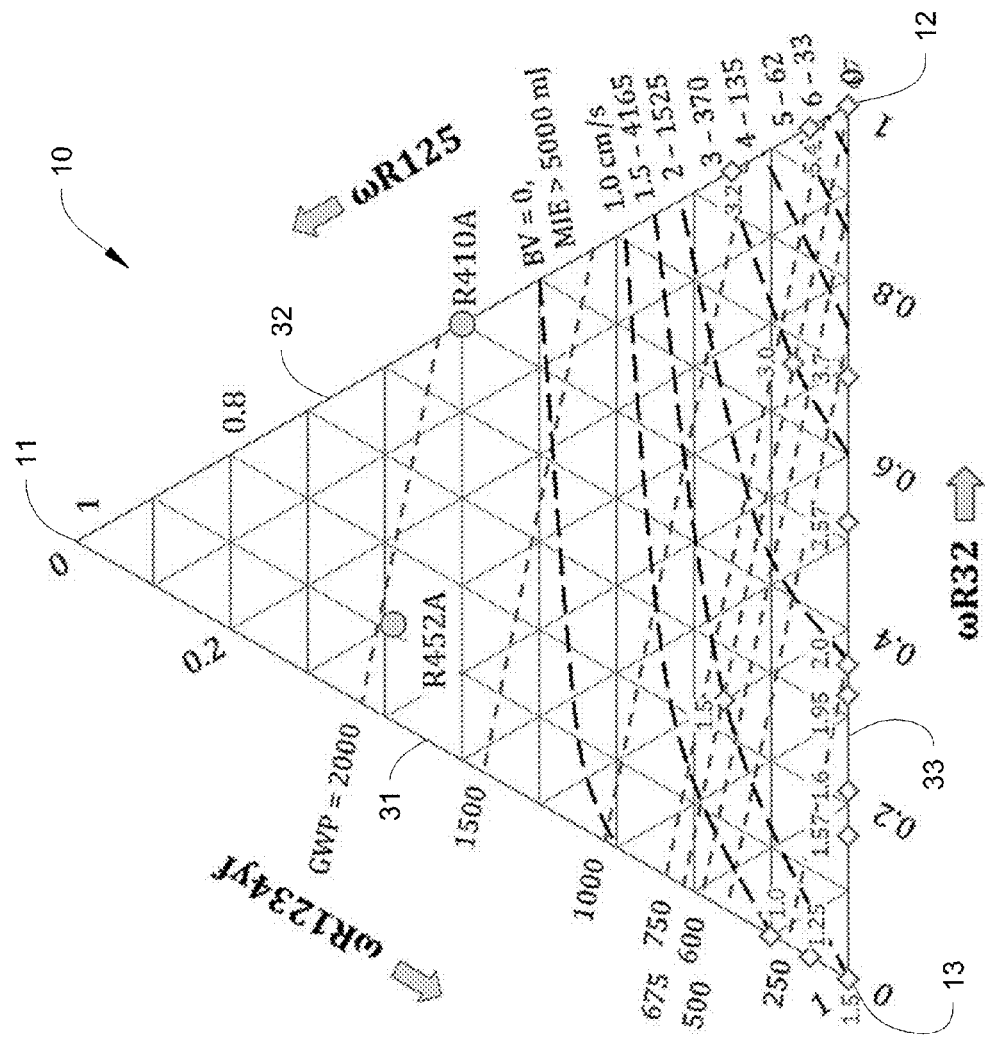
FIG. 13 illustrates a matrix showing lines of constant GWP and lines of constant BV.

FIG. 13 was developed to show a matrix 10 with contours of GWP and burning velocity as functions of R32, R1234yf and R125 concentration. Each side of the triangle 31, 32, 33 corresponds to a change of a GWP, BV and isentropic efficiency of a compressor respectively when a mass fraction (e.g. % wt) of the refrigerants changes in a refrigerant composition. Each vertex 11, 12, 13 of the triangle corresponds to 100% wt of the refrigerant R125, R32 and R1234yf respectively.

The performance of R32/R125/R1234yf blends is predicted here using the simple thermodynamic cycle model employed in earlier work. Key assumptions are that the evaporator and condenser saturation temperatures are the average of the bubble and dew point temperatures and are the same for all refrigerants. Compressor isentropic efficiency is also assumed to be the same for all refrigerants.

The matrix 10 shows lines of constant GWP and estimates of lines of constant burning velocity (BV) based on available data collected. The diamond symbols are burning velocity data points from various sources that calibrate the constant burning velocity curves. The matrix shows a range of compositions that could be useful as refrigerants with lower GWP and lower flammability (burning velocity) for a range of applications for replacing R22, R407C, R404A, and R410A.

Figure 14:
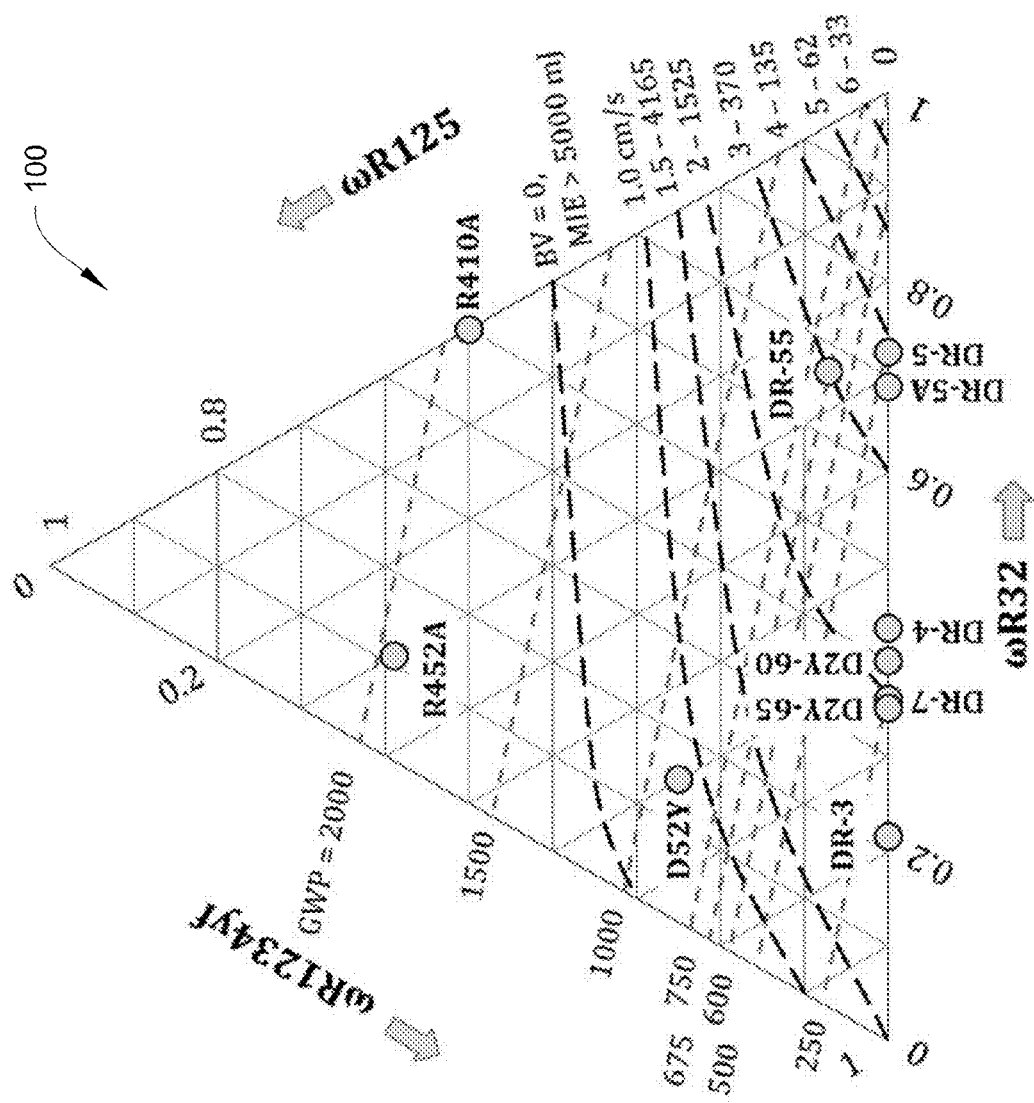
FIG. 14 illustrates the matrix of FIG. 13 with further data points of composition blends.

FIG. 14 shows a matrix 100, which is based on the matrix of FIG. 13 and with the same sides and vertices of FIG. 13. The matrix is that same as the matrix 10 of FIG. 13, except that the burning velocity data points have been removed, and the locations of certain composition blends are shown. R410A has been a commercial fluid for some time, being the replacement for R22. R452A is a blend developed to replace R404A in transport refrigeration applications. DR-55 is a blend developed as a replacement for R410A and is one of the compositions herein. DR-55 is one preferred blend to replace R410A that has reducing flammability compared to R32 while being a better match to R410A characteristics and having the same GWP as R32. DR-5, DR-5A (now R454B), DR-4, and DR-3 are R32/-R1234yf blends proposed by DuPont/Chemours. D2Y-60, D2Y-65, and D52Y are blends proposed by Daikin.

Figure 15:
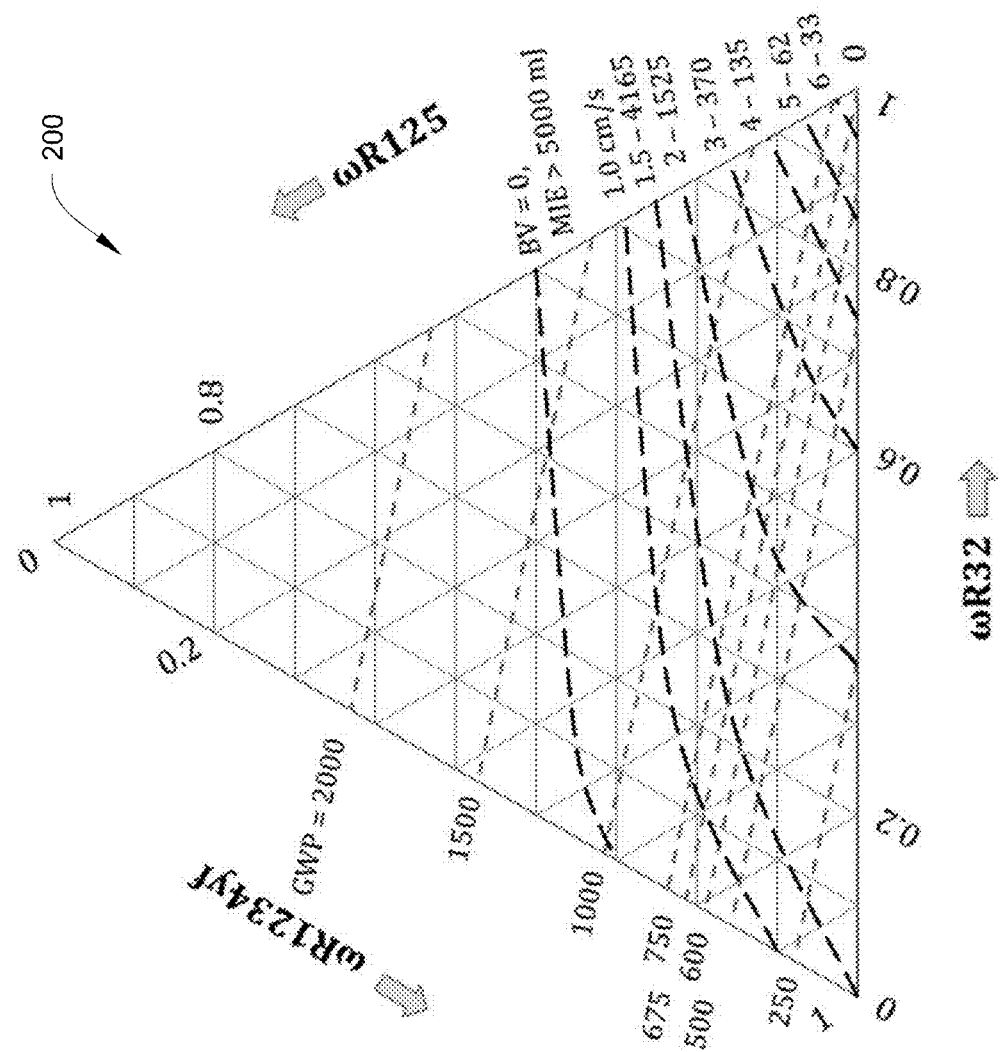
FIG. 15 illustrates the matrix of FIG. 13 showing lines of constant GWP and lines of constant BV.

FIG. 15 shows a matrix 200 that is based from the matrix 10 of FIG. 13, and includes the same sides and vertices as in FIG. 13. FIG. 15 shows the constant GWP lines and the constant burning velocity curves, and where the minimum ignition energy (MIE) is also shown with BV. MIE is the amount of energy needed to initiate ignition of a flammable fluid. The MIE values shown on this and the previous matrices are estimated from a known correlation with BV.

Figure 16:
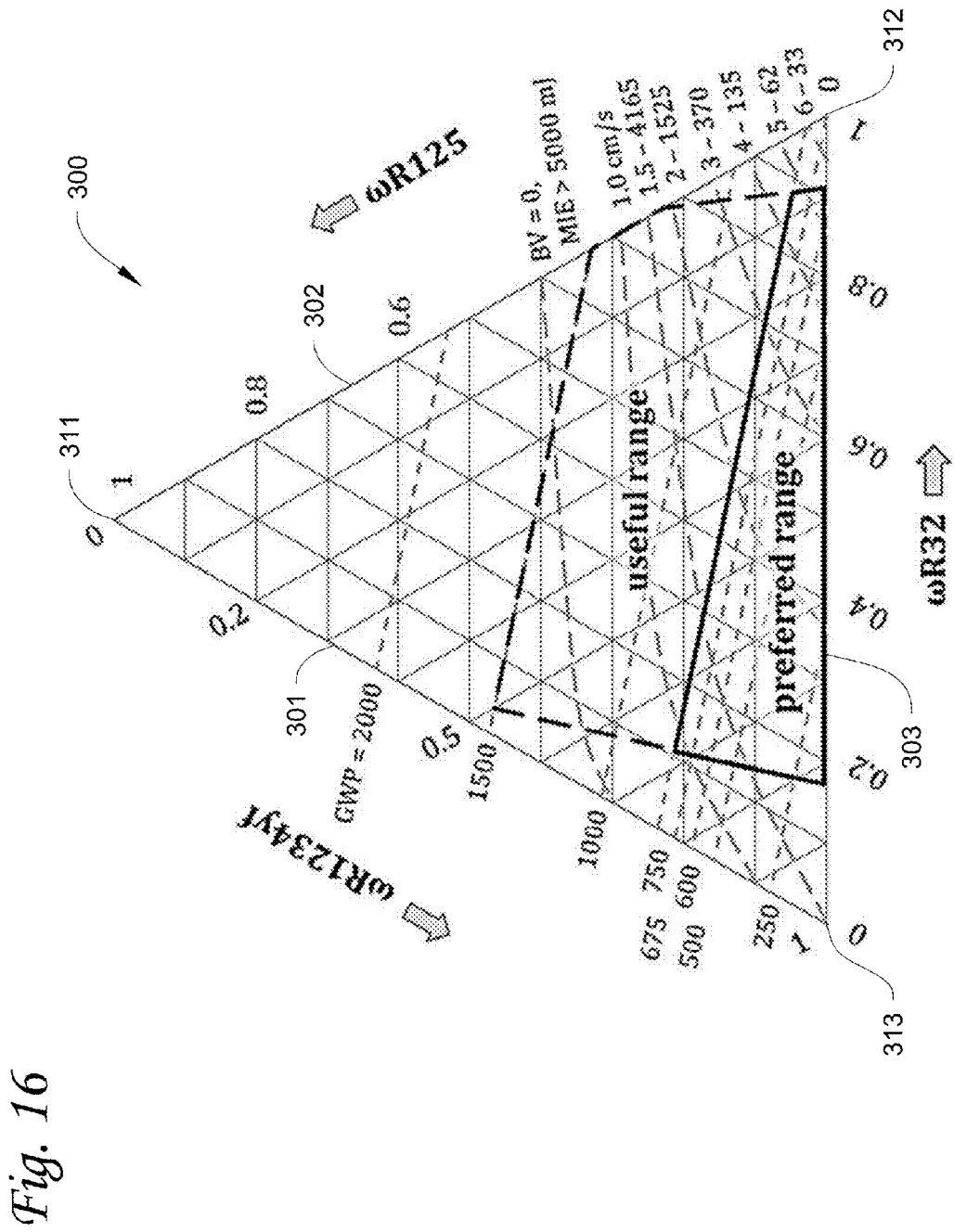
FIGS. 16-19 each illustrate a matrix that can be used to select refrigerant compositions to achieve a desired set of properties.

Referring to FIG. 16, a matrix 300 is disclosed which can be used in a method of making a refrigerant composition with more than one refrigerant to obtain a refrigerant composition with desired properties. The three exemplary refrigerants in the illustrated embodiment are R125, R1234yf and R32. Each side of the triangle 301, 302, 303 corresponds to a change of a GWP, BV and isentropic efficiency of a compressor respectively when a mass fraction (e.g. % wt) of the refrigerants changes in a refrigerant composition. Each vertex 311, 312, 313 of the triangle corresponds to 100% wt of the refrigerant R125, R32 and R1234yf respectively.

As illustrated, referring to side 301, a value of GWP increases in the refrigerant composition when the mass fraction of R1234yf decreases. Referring to side 302, a value of the BV decreases when the mass fraction of R125 increases. Referring to side 303, a value of the isentropic efficiency increases when the mass fraction of R1234yf decreases. Properties (e.g. GWP, BV and isentropic efficiency) of a refrigerant composition with a specific mass fraction of the refrigerants R1234yf, R32 and R125 can be estimated by using the matrix 300.

In some embodiments, for example, a desired set of properties of a useful refrigerant composition may include a GWP that is no more than 1500, BV that is no more than 5 cm/s, and a capacity that is no more than 105% of the capacity of R410A and no less than 90% of the capacity of R22. Based on these properties, a useful range may be defined in the matrix 300. The refrigerant compositions in the useful range can satisfy the desired set of properties.

In some embodiments, for example, a more preferred set of properties of a useful refrigerant composition may include a GWP that is no more than 750, BV that is no more than 5 cm/s, and a capacity that is no more than 105% of the capacity of R410A and no less than 90% of the capacity of R22. Based on these properties, a preferred range may be defined within the useful range (e.g. the area defined by the solid lines) in the matrix 300. The refrigerant compositions in the preferred range can satisfied the more preferred set of properties.

It is noted that the refrigerants R124, R1234yf and R32 are exemplary. Other suitable refrigerants may be used to address the flammability, capacity and/or GWP of the refrigerant composition. For example, another suitable non-flammable refrigerant can be used to reduce the flammability of the refrigerant composition. Another suitable low GWP refrigerant can be used to reduce the GWP of the refrigerant composition. Another suitable high capacity refrigerant can be used to increase the capacity of the refrigerant composition.

Based on the matrix 300, the refrigerant compositions may be further selected to replace specific refrigerants, such as for example, R404A, R410A, and R22. Generally, the capacity (e.g. in the form of isentropic efficiency of compressor) of these refrigerants may be used to define a refrigerant composition range in the matrix 300 that can be used to replace these refrigerants.

It is noted that the capacity may be provided, for example, in a measurement performed in a lab and/or in a computer based simulation. The capacity may be provided based on operation conditions provided in Standard for Performance Rating of Unitary Air-Conditioning & Air-source Heat Pump Equipment (e.g. Air-Conditioning, Heating and Refrigeration Institute Standard (AHRI Std) 210/240).

The matrix 300 shows the range of compositions that produce capacities similar to R410A (from 90% to 105%). The useful range is bounded at the top by GWP=1500. The preferred range is bounded at the top by GWP=750. The composition of DR-55 was selected to have a burning velocity of 3 cm/s and a GWP of 675. DR-55 produces a capacity about 2.5% less than R410A, an acceptable compromise to achieve the lower burning velocity.

R32 is located at the lower right corner of the matrix with a burning velocity of 6.7 cm/s and a GWP of 677. DR-55 is a significantly closer match to R410A characteristics than R32.

Figure 17:
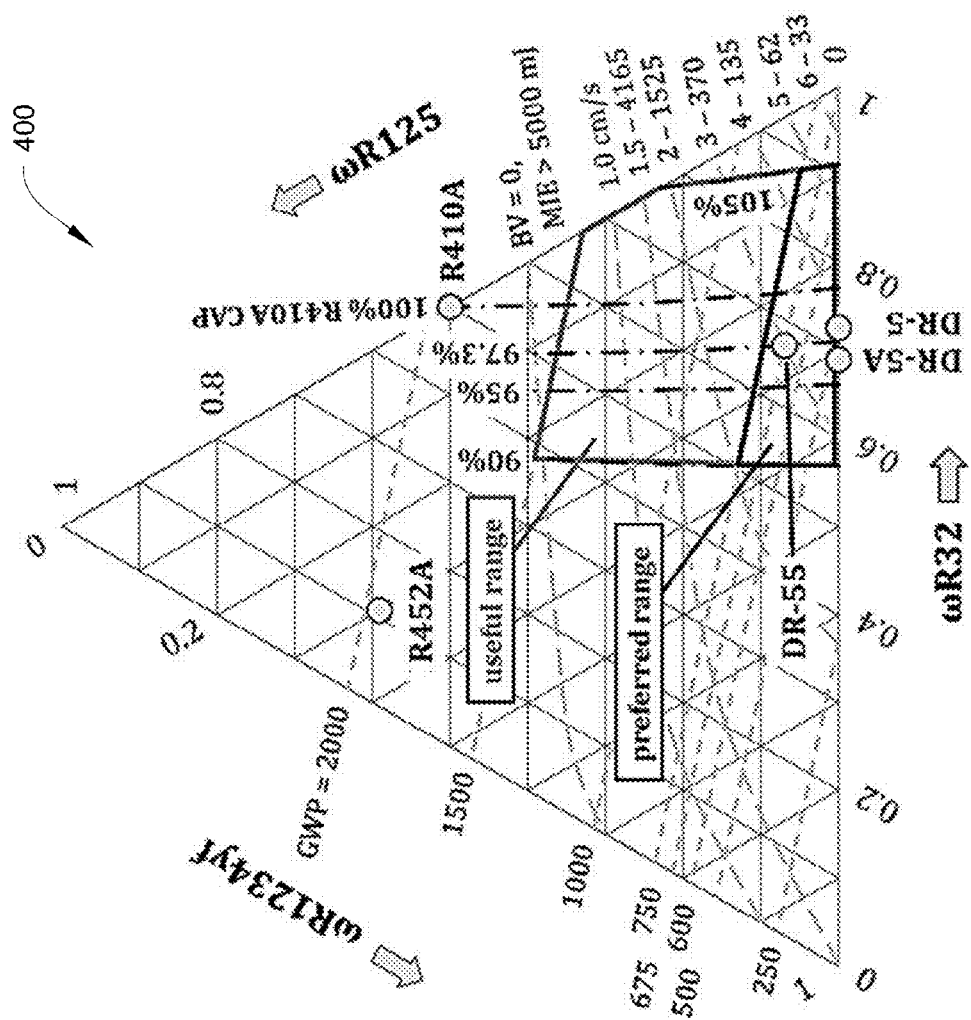

Referring to FIG. 17, a method of making refrigerant a composition to replace R410A using the matrix 400 is described and is based on the matrix 300 of FIG. 16, where the sides and vertices are the same as in FIG. 16. The capacity of the refrigerant compositions in the matrix 400 may be matched to no less than 90% of the capacity of R410A (90% line in the matrix 400) to no more than 105% of the capacity of R410A (105% line in the matrix 400). A useful range and a preferred range of the refrigerant compositions to replace R410A may be further defined in the useful range and the preferred range as illustrated in FIG. 16 by the 90% line and the 105% line, which are illustrated in FIG. 17 by the darkened lines. The refrigerant compositions in the useful range in FIG. 17 generally has a capacity that is no less than 90% of the capacity of R410A and no more than 105% of the capacity of R410A, a GWP that is no more than 1500, and BV that is lower than 5 cm/s. The refrigerant compositions in the preferred range in FIG. 17 generally has a capacity that is no less than 90% of the capacity of R410A and no more than 105% of the capacity of R410A, a GWP that is no more than 750, and BV that is lower than 5 cm/s. Specific refrigerant compositions may also be selected in the matrix 400 based on, for example, a specific GWP, a specific capacity and a specific BV. For example, the refrigerant compositions having a GWP of about 675, 100% of the capacity of R410A and a BV that is lower than 5 cm/s may be 74% wt of R32/5.5% wt R125/20.5% R1234yf, which is shown as the cross point of the line for GWP 675 and the line for 100% R410A capacity. Similarly, in some other embodiments, a refrigerant composition with 98% of the capacity of R410A, a GWP that is about 675 and a BV that is lower than 5 cm/s may be 69% wt R32/6.5% wt R125/24.5% wt R1234yf. In some embodiments, a refrigerant composition with 96% of the capacity of R410A, a GWP that is about 675 and a BV that is lower than 5 cm/s may be 65% wt R32/7.5% wt R125/28.5% wt R1234yf. In some embodiments, a refrigerant composition with 90% of the capacity of R410A, a GWP that is about 675 and a BV that is lower than 5 cm/s may be 52% wt R32, 10% wt R125 and 38% wt R1234yf.

In FIG. 17, lines of constant capacity at 90%, 95%, 100%, and 105% relative to R410A are shown on the composition diagram (matrix). The operating conditions are taken as 115° F. (46.1° C.) average condenser saturation temperature with 15° F. (8.3° C.) of exit sub-cooling, 50° F. (10° C.) average evaporator saturation temperature with 20° F. (11.1° C.) of exit superheat, and a compressor isentropic efficiency of 0.70. These conditions are representative of operation at the AHRI Standard 210/240 (AHRI-210/240, 2008) unitary air-conditioning "A Test" point. FIG. 17 shows that there is a wide range of compositions that can match the capacity of R410A within −10% to +5% while potentially having burning velocities below 3 cm/s. The flammability of potential R410A replacements may be reduced by adding R125 to R32/R1234yf blends up to a chosen limit for GWP. The blend of 67% wt R32/7% wt R125/26% wt R1234yf, labelled DR-55, with a GWP of 675, burning velocity of 3.0 cm/s and 97.3% of R410A capacity has been chosen for further evaluation here. Similarly, blends of R32 and R1234yf with R125 can be formulated to closely match the characteristics of R404A and R22 with lower flammability. See discussion of FIGS. 18 and 19.

The thermodynamic properties of DR-55, along with R410A and R32 are reported. For a given temperature, the pressure of DR-55 runs 5% lower than R410A and R32 runs 1% to 2% higher than R410A. DR-55 exhibits a small temperature glide, ranging from 1.6° F. (0.9° C.) at −40° F. (−40° C.) to a maximum of 2.3° F. (1.3° C.) at 77° F. (25° C.).

Critical temperature and pressure of R410A, DR-55 and R32 are listed in Table 1. DR-55's critical temperature is much higher than R410A and slightly higher than R32. This provides extended high ambient temperature operating range relative to R410A. The pressure and temperature enthalpy domes are wider for DR-55 than for R410A, because of DR-55's higher R32 content. This can reduce the refrigerant mass flow rate needed to achieve a given capacity, potentially reducing pressure drop through heat exchangers. Although DR-55 has an elevated compressor discharge temperature relative to R410A, it is substantially lower than with R32.

TABLE 1

| Critical Properties of Refrigerants. | | | |
|---|---|---|---|
| | R410A | DR-55 | R32 |
| critical temperature (° F./° C.) | 160.4/71.3 | 175.4/79.7 | 172.6/78.1 |
| critical pressure (psia/MPa) | 711/4.90 | 803/5.53 | 839/5.78 |

Figure 18:
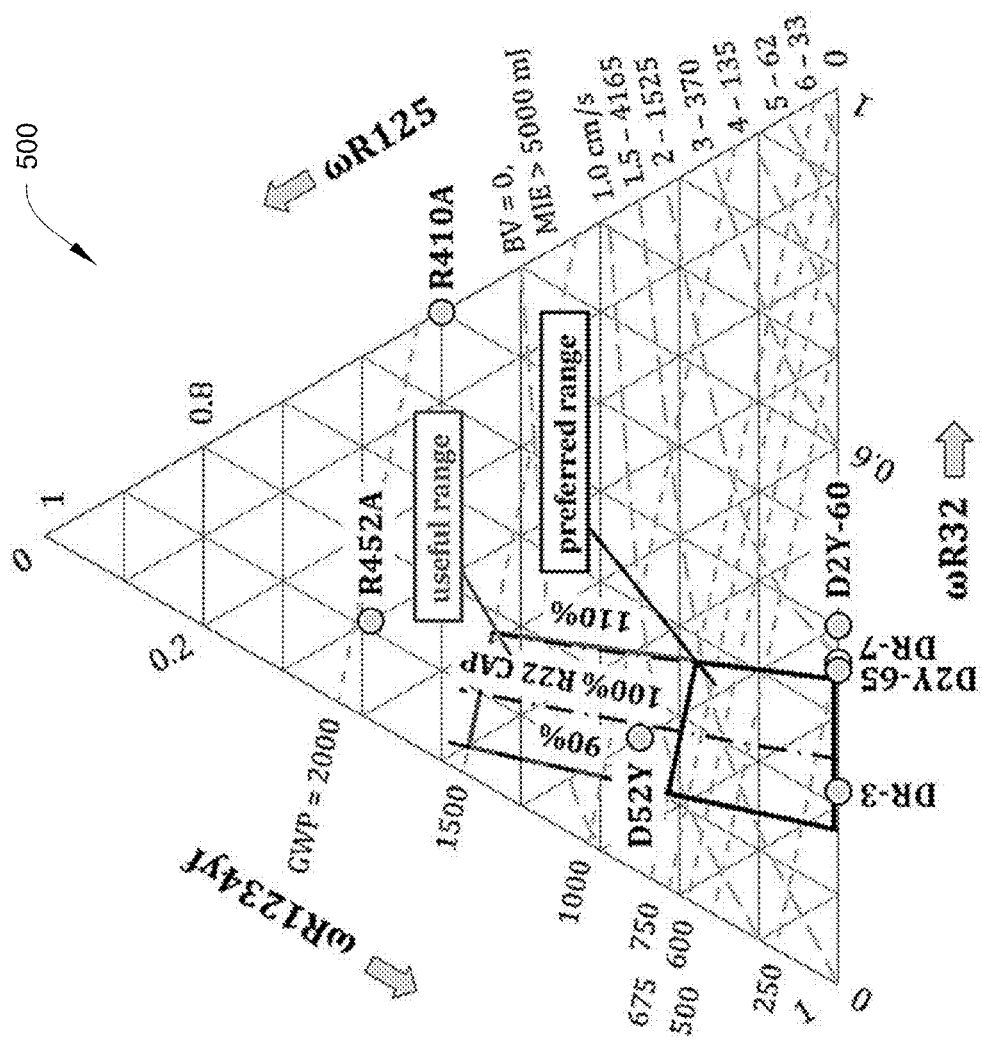

Referring to FIG. 18, a method of making a refrigerant composition to replace R22 based on the matrix 500 is described and is based on the matrix 300 of FIG. 16, where the sides and vertices are the same as in FIG. 16. The capacity of the refrigerant compositions in the matrix 500 may be matched to no less than 90% of the capacity of R22 (90% line in the matrix 500) to no more than 110% of the capacity of R22 (110% line in the matrix 500). A useful range and a preferred range of the refrigerant compositions to replace R22 may be further defined in the useful range and the preferred range as illustrated in FIG. 16 by the 90% line and the 110% line, which are illustrated in FIG. 18 by darkened lines. The refrigerant compositions in the useful range in FIG. 18 generally has a capacity that is no less than 90% of the capacity of R22 and no more than 110% of the capacity of R22, a GWP that is no more than 1500, and BV that is lower than 5 cm/s. The refrigerant compositions in the preferred range in FIG. 18 generally has a capacity that is no less than 90% of the capacity of R22 and no more than 110% of the capacity of R22, a GWP that is no more than 750, and BV that is lower than 5 cm/s. Specific refrigerant compositions may also be selected in the matrix 500 based on, for example, a specific GWP, a specific capacity and a specific BV. For example, the refrigerant compositions having a GWP of about 675, 110% of the capacity of R22 and a BV that is lower than 5 cm/s may be 28% wt of R32/15% wt R125/57% of R1234yf, which is shown as the cross point of the line for GWP 675 and the line for 110% of the capacity of R22. Similarly, in some other embodiments, a refrigerant composition with 100% of the capacity of R22, a GWP that is about 675 and a BV that is lower than 5 cm/s may be 19.5% wt R32/17% wt R125/63.5% wt R1234yf. In some embodiments, a refrigerant composition with 90% of the capacity of R22, a GWP that is about 675 and a BV that is lower than 5 cm/s may be 11.5% wt R32/19% wt R125/69.5% wt R1234yf.

The matrix 500 shows the range of compositions that produce capacities similar to R22 (from 90% to 110%). The useful range is again bounded at the top by GWP=1500. The preferred range is again bounded at the top by GWP=750. Note that D52Y is a close match to R22 characteristics with a GWP of 895 and a burning velocity estimated to be less than 1 cm/s. R407C has been used as a replacement for R22. New lower GWP replacements for R22 may also serve as replacements for R407C where R407C has already by substituted for R22.

Figure 19:
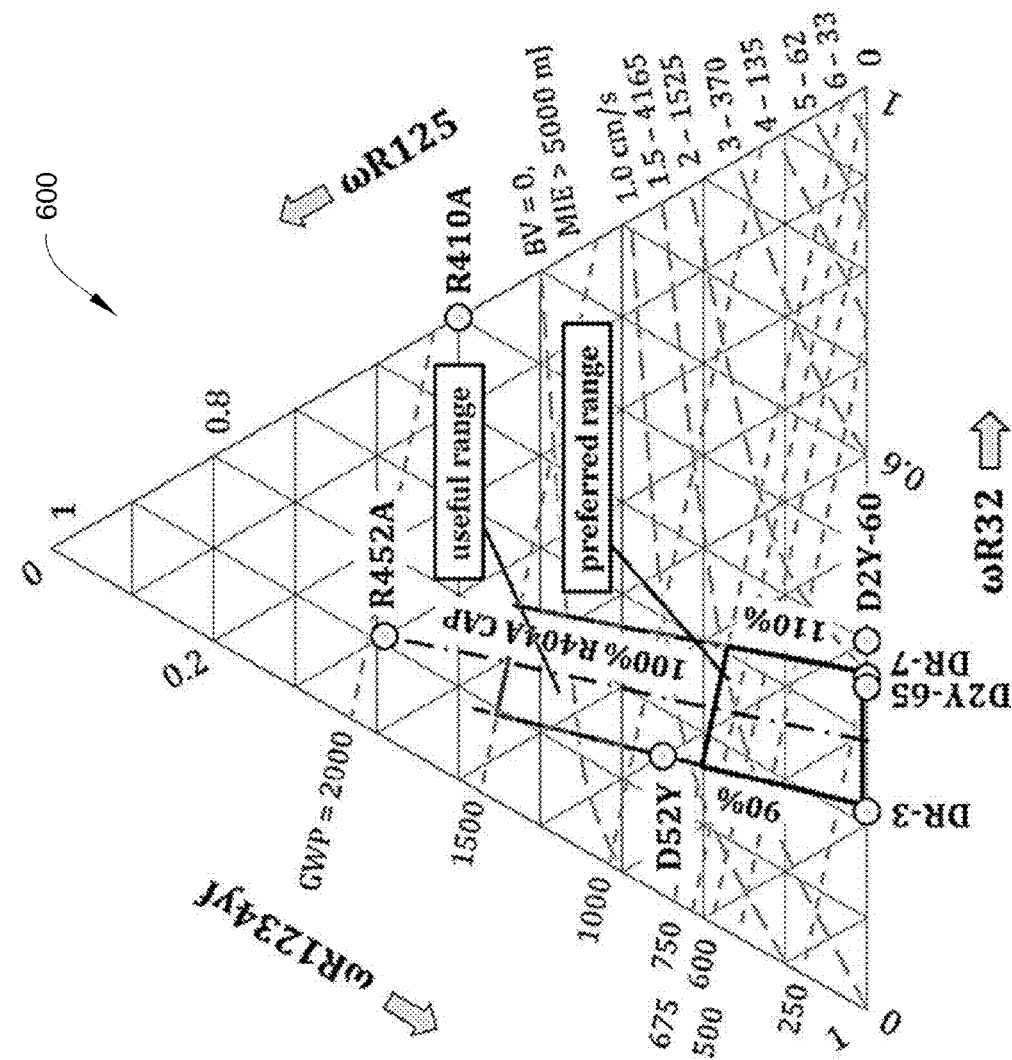

Referring to FIG. 19, a method of making refrigerant compositions to replace R404A based on the matrix 600 is described, and is based on the matrix 300 of FIG. 16, where the sides and vertices are the same as in FIG. 16. The capacity of the refrigerant compositions in the matrix 600 may be matched to no less than 90% of the capacity of R404A (90% line in the matrix 600) to no more than 110% of the capacity of R404A (110% line in the matrix 600). A useful range and a preferred range of the refrigerant compositions to replace R404A may be further defined in the useful range and the preferred range as illustrated in FIG. 16 by the 90% line and the 110% line, which are illustrated in FIG. 19 by darkened lines. The refrigerant compositions in the useful range in FIG. 19 generally has a capacity that is no less than 90% of the capacity of R404A and no more than 110% of the capacity of R404A, a GWP that is no more than 1500, and BV that is lower than 5 cm/s. The refrigerant compositions in the preferred range in FIG. 19 generally has a capacity that is no less than 90% of the capacity of R404A and no more than 110% of the capacity of R404A, a GWP that is no more than 750, and BV that is lower than 5 cm/s. Specific refrigerant compositions may also be selected in the matrix 600 based on, for example, a specific GWP, a specific capacity and a specific BV. For example, the refrigerant compositions having a GWP of about 675, 110% of the capacity of R404A and a BV that is lower than 5 cm/s may be 31.5% wt of R32/14.5% wt of R125/54% of R1234yf, which is shown as the cross point of the line for GWP 675 and the line for 110% of the capacity of R404A. Similarly, in some other embodiments, a refrigerant composition with 100% of the capacity of R404A, a GWP that is about 675 and a BV that is lower than 5 cm/s may be 24% wt R32/16% wt R125/60% wt R1234yf. In some embodiments, a refrigerant composition with 90% of the capacity of R404A, a GWP that is about 675 and a BV that is lower than 5 cm/s may be 17% wt R32/17.5% wt R125/69.5% wt R1234yf.

The matrix 600 shows the range of compositions that produce capacities similar to R404A (from 90% to 110%). The useful range is again bounded at the top by GWP=1500. The preferred range is again bounded at the top by GWP=750.

It is to be appreciated that other refrigerants may be used to achieve the desired properties as listed herein. It is also to be appreciated that the method described herein may be used to achieve other desired properties in the refrigerant compositions.

Generally, a method of making a refrigerant composition with a desired set of properties may include determining the desired set of properties, and selecting at least one refrigerant for each of the properties in the desired set of properties. The refrigerant(s) selected to exhibit the desired property has a property value that is better than the property value of the desired property exhibited by the other refrigerants in the composition. The method may also include mixing the selected refrigerants in a suitable mass fraction so that the resulting refrigerant composition has the desired set of properties. In some embodiments, a matrix can be made to represent a correlation of property value changes in response to mass fraction changes in the selected refrigerants. Suitable refrigerant composition ranges to achieve the desired set of properties may be selected from the matrix by defining boundary property values in the matrix. The method disclosed herein can provide flexibility in making a refrigerant to satisfy, for example, different design requirements.

Exemplary embodiments of refrigerant compositions as disclosed herein are listed in the following Table 2.

TABLE 2

| Composition (% by weight) | GWP | BV |
|---|---|---|
| 50% R32/50% R125 | 1924 | n/a |
| 100% R32 | ~677 | 6.7 |
| R32/R125/R1234yf (74.0%/5.5%/20.5%) | ~677 (e.g. 675) | 3.4 |
| R32/R125/R1234yf (69.0%/6.5%/25.5%) | ~677 (e.g. 673) | 3.1 |
| R32/R125/R1234yf (67.0%/7.0%/26.0%) | ~677 | 3.0 |
| R32/R125/R1234yf (64.0%/7.5%/28.5%) | ~677 (e.g. 671) | 2.8 |
| R32/R125/R1234yf (62.0%/10.5%/27.5%) | ~750 (e.g. 753) | 2.6 |
| R32/R125/R1234yf (20.0%/17.5%/62.5%) | ~677 (e.g. 674) | 1.3 |
| R32/R125/R1234yf (18.0%/20.0%/62.0%) | ~750 (e.g. 756) | 1.1 |

Table 2 illustrates simulation results of GWP and BV of various refrigerant compositions. As illustrated in Table 2, a refrigerant composition R32/R125 (50% wt/50% wt) has a GWP of 1924 is refrigerant R410A in some applications and can be compared to other refrigerant blends for potential replacement.

Refrigerant compositions of R32/R125/R1234yf (74.0% wt/5.5% wt/20.5% wt), R32/R125/R1234yf (69.0% wt/6.5% wt/25.5% wt), R32/R125/R1234yf (64.0% wt/7.5% wt/28.5% wt) and R32/R125/R1234yf (20.0% wt/17.5% wt/62.5% wt) may have a similar GWP as 100% wt R32 (e.g. 677), but increasingly lower BV (e.g. lower flammability) respectively compared to 100% wt R32 (e.g. 6.7). The refrigerant composition of R32/R125/R1234yf (62.0% wt/10.5% wt/27.5% wt), and R32/R125/R1234yf (18.0% wt/20.0% wt/62.0% wt) may have a slightly higher GWP (e.g. 750) compared to 100% wt R32, but a lower BV (e.g. <1 cm/s). The refrigerant composition R32/R125/R1234yf (74.0% wt/5.5% wt/20.5% wt) may be used to replace R410A in some applications. More preferred, the refrigerant compositions R32/R125/R1234yf (69.0% wt/6.5% wt/25.5% wt) may be used to replace R410A in some applications because, for example, a capacity of the refrigerant compositions may be similar to R410A. Even more preferred, any one or more of the refrigerant compositions R32/R125/R1234yf (67.0%/7.0%/26.0%) or R32/R125/R1234yf (64.0% wt/7.5% wt/28.5% wt) or R32/R125/R1234yf (62.0% wt/10.5% wt/27.5% wt) may be used to replace R410A in some applications. The refrigerant compositions R32/R125/R1234yf (20.0% wt/17.5% wt/62.5% wt) or R32/R125/R1234yf (18.0% wt/20.0% wt/62.0% wt) may be used to replace R22, R407C or R404A in some applications, because, for example, a capacity of the refrigerant compositions may be similar to R22, R407C or R404A.

Certain of the refrigerant compositions herein are non-azeotropic compositions. A non-azeotropic composition may have certain advantages over azeotropic or near azeotropic mixtures. A non-azeotropic composition is a mixture of two or more substances that behaves as a mixture rather than a single substance. One way to characterize a non-azeotropic composition is that the vapor produced by partial evaporation or distillation of the liquid has a substantially different composition as the liquid from which it was evaporated or distilled, that is, the admixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if, after 50 weight percent of the composition is removed, such as by evaporation or boiling off, the difference in vapor pressure between the original composition and the composition remaining after 50 weight percent of the original composition has been removed is greater than about 10 percent.

The refrigerant compositions may be prepared by any convenient method to combine the desired amounts of the individual components. A preferred method is to weigh the desired component amounts and thereafter combine the components in an appropriate vessel. Agitation may be used, if desired.

An alternative way for making refrigerant compositions may be a method for making a refrigerant blend composition, where the refrigerant blend composition includes a composition as disclosed herein. The method may include (i) reclaiming a volume of one or more components of a refrigerant composition from at least one refrigerant container, (ii) removing impurities sufficiently to enable reuse of said one or more of the reclaimed components, (iii) and optionally, combining all or part of said reclaimed volume of components with at least one additional refrigerant composition or component.

A refrigerant container may be any container in which is stored a refrigerant blend composition that has been used in a refrigeration apparatus, air-conditioning apparatus or heat pump apparatus. The refrigerant container may be the refrigeration apparatus, air-conditioning apparatus or heat pump apparatus in which the refrigerant blend was used. Additionally, the refrigerant container may be a storage container for collecting reclaimed refrigerant blend components, including but not limited to pressurized gas cylinders.

Residual refrigerant means any amount of refrigerant blend or refrigerant blend component that may be moved out of the refrigerant container by any method known for transferring refrigerant blends or refrigerant blend components.

Impurities may be any component that is in the refrigerant blend or refrigerant blend component due to its use in a refrigeration apparatus, air-conditioning apparatus or heat pump apparatus. Such impurities include but are not limited to refrigeration lubricants, particulates including but not limited to metal, metal salt or elastomer particles, that may have come out of the refrigeration apparatus, air-conditioning apparatus or heat pump apparatus, and any other contaminants that may adversely affect the performance of the refrigerant blend composition.

Such impurities may be removed sufficiently to allow reuse of the refrigerant blend or refrigerant blend component without adversely affecting the performance or equipment within which the refrigerant blend or refrigerant blend component will be used.

It may be necessary to provide an additional refrigerant blend or refrigerant blend component to the residual refrigerant blend or refrigerant blend component in order to produce a composition that meets the specifications required for a given product. For instance, if a refrigerant blend has three components in a particular weight percentage range, it may be necessary to add one or more of the components in a given amount in order to restore the composition to within the specification limits.

The refrigerant compositions herein may have low ozone depletion potential and low global warming potential (GWP). Additionally, the refrigerant compositions may have global warming potentials that are less than many hydrofluorocarbon refrigerants currently in use. One aspect of the embodiments described herein is to provide a refrigerant with a global warming potential of less than 1000. Another aspect of the embodiments herein is to reduce the net GWP of refrigerant mixtures by adding fluoroolefins to the refrigerant compositions.

It is to be noted that other components, e.g. lubricant or another refrigerant, may be added to the refrigerant compositions as described herein. The refrigerant compositions as described herein may also include impurities.

The refrigerant compositions may further include a lubricant. The lubricant may be a lubricant suitable for use with a refrigeration, air-conditioning, or heat pump apparatus. Lubricants include those conventionally used in compression refrigeration apparatus utilizing chlorofluorocarbon refrigerants. Such lubricants and their properties are discussed in the 1990 ASHRAE Handbook, Refrigeration Systems and Applications, chapter 8, titled "Lubricants in Refrigeration Systems", pages 8.1 through 8.21. Lubricants may include those commonly known as "mineral oils" in the field of compression refrigeration lubrication. Mineral oils may include paraffins (i.e. straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). Lubricants may include those commonly known as "synthetic oils" in the field of compression refrigeration lubrication. Synthetic oils may include alkylaryls (i.e. linear and branched alkyl alkylbenzenes), synthetic paraffins and naphthenes, and poly(alphaolefins). Representative conventional lubricants may include the commercially available BVM 100 N (paraffinic mineral oil sold by BVA Oils), Suniso® 3GS and Suniso® 5GS (naphthenic mineral oil sold by Crompton Co.), Sontex® 372LT (naphthenic mineral oil sold by Pennzoil), Calumet® RO-30 (naphthenic mineral oil sold by Calumet Lubricants), Zerol® 75, Zerol® 150 and Zerol® 500 (linear alkylbenzenes sold by Shrieve Chemicals) and HAB 22 (branched alkylbenzene sold by Nippon Oil).

Lubricants may include those that have been designed for use with hydrofluorocarbon refrigerants and are miscible with refrigerant compositions described herein under compression refrigeration, air-conditioning, or heat pump apparatus' operating conditions. Such lubricants and their properties are discussed in "Synthetic Lubricants and High-Performance Fluids", R. L. Shubkin, editor, Marcel Dekker, 1993. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), and polyvinyl ethers (PVEs). These lubricants are readily available from various commercial sources.

Lubricants may be selected by considering a given compressor's requirements and the environment to which the lubricant will be exposed. In some embodiments, lubricants may have a kinematic viscosity of at least about 5 cs (centistokes) at 40° C.

Commonly used refrigeration system additives may optionally be added, as desired, to the refrigerant compositions in order to enhance lubricity and system stability. These additives are generally known within the field of refrigeration compressor lubrication, and include anti-wear agents, extreme pressure lubricants, corrosion and oxidation inhibitors, metal surface deactivators, free radical scavengers, foaming and antifoam control agents, leak detectants and the like. In general, these additives are present only in small amounts relative to the overall lubricant composition. They are typically used at concentrations of from less than about 0.1% to as much as about 3% of each additive. These additives are selected on the basis of the individual system requirements. Some typical examples of such additives may include, but are not limited to, lubrication enhancing additives, such as alkyl or aryl esters of phosphoric acid and of thiophosphates. Additionally, the metal dialkyl dithiophosphates (e.g. zinc dialkyl dithiophosphate or ZDDP, Lubrizol 1375) and other members of this family of chemicals may be used in compositions of the present invention. Other antiwear additives include natural product oils and asymmetrical polyhydroxyl lubrication additives such as Synergol TMS (International Lubricants). Similarly, stabilizers such as antioxidants, free radical scavengers, and water scavengers may be employed. Compounds in this category can include, but are not limited to, butylated hydroxy toluene (BHT) and epoxides.

The refrigerant compositions may further include one or more tracers selected from the group including hydrofluorocarbons (HFCs), deuterated hydrocarbons, deuterated hydrofluorocarbons, perfluorocarbons, fluoroethers, brominated compounds, iodated compounds, alcohols, aldehydes, ketones, nitrous oxide (N2O) and combinations thereof. The tracer compounds are added to the refrigerant compositions in previously determined quantities to allow detection of any dilution, contamination or other alteration of the composition, as described in U.S. Pat. No. 7,641,809, which is incorporated by reference in its entirety. Single tracer compounds may be used in combination with a refrigeration/heating fluid in the refrigerant compositions or multiple tracer compounds may be combined in any proportion to serve as a tracer blend. The tracer blend may contain multiple tracer compounds from the same class of compounds or multiple tracer compounds from different classes of compounds. For example, a tracer blend may contain two or more deuterated hydrofluorocarbons, or one deuterated hydrofluorocarbon in combination with one or more perfluorocarbons.

The refrigerant compositions may further include an ultra-violet (UV) dye and optionally a solubilizing agent. The UV dye is a useful component for detecting leaks of the composition by permitting one to observe the fluorescence of the dye in the composition at a leak point or in the vicinity of refrigeration, air-conditioning, or heat pump apparatus. One may observe the fluorescence of the dye under an ultra-violet light. Solubilizing agents may be needed due to poor solubility of such UV dyes in some compositions.

By "ultra-violet" dye is meant a UV fluorescent composition that absorbs light in the ultra-violet or "near" ultraviolet region of the electromagnetic spectrum. The fluorescence produced by the UV fluorescent dye under illumination by a UV light that emits radiation with wavelength from 10 nanometers to 750 nanometers may be detected. Therefore, if a composition containing such a UV fluorescent dye is leaking from a given point in a refrigeration, air-conditioning, or heat pump apparatus, the fluorescence can be detected at the leak point. Such UV fluorescent dyes include but are not limited to naphthalimides, perylenes, coumarins, anthracenes, phenanthracenes, xanthenes, thioxanthenes, naphthoxanthenes, fluoresceins, and derivatives or combinations thereof.

Solubilizing agents may include at least one compound selected from the group including hydrocarbons, hydrocarbon ethers, dimethylether, polyoxyalkylene glycol ethers, amides, nitriles, ketones, chlorocarbons, esters, lactones, aryl ethers, fluoroethers and 1,1,1-trifluoroalkanes. The polyoxyalkylene glycol ethers, amides, nitriles, ketones, chlorocarbons, esters, lactones, aryl ethers, fluoroethers and 1,1,1-trifluoroalkanes solubilizing agents are defined herein as being compatibilizers for use with conventional refrigeration lubricants.

Hydrocarbon solubilizing agents may include hydrocarbons including straight chained, branched chain or cyclic alkanes or alkenes containing five or fewer carbon atoms and only hydrogen with no other functional groups. Representative hydrocarbon solubilizing agents include propane, propylene, cyclopropane, n-butane, isobutane, 2-methylbutane and n-pentane. It is appreciated that if the composition contains a hydrocarbon, then the solubilizing agent may not be the same hydrocarbon. Hydrocarbon ether solubilizing agents may include ethers containing only carbon, hydrogen and oxygen, such as dimethyl ether (DME).

Solubilizing agents may be present as a single compound, or may be present as a mixture of more than one solubilizing agent. Mixtures of solubilizing agents may contain two solubilizing agents from the same class of compounds for example two lactones, or two solubilizing agents from two different classes, such as a lactone and a polyoxyalkylene glycol ether.

Solubilizing agents such as ketones may have an objectionable odor, which can be masked by addition of an odor masking agent or fragrance. Typical examples of odor masking agents or fragrances may include Evergreen, Fresh Lemon, Cherry, Cinnamon, Peppermint, Floral or Orange Peel all commercially available, as well as d-limonene and pinene. Such odor masking agents may be used at concentrations of from about 0.001% to as much as about 15% by weight based on the combined weight of odor masking agent and solubilizing agent.

Vapor-compression refrigeration, air-conditioning, or heat pump systems include an evaporator, a compressor, a condenser, and an expansion device. A vapor-compression cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

The embodiments disclosed herein provide a refrigeration, air-conditioning or heat pump apparatus containing a refrigerant composition as described herein. In some embodiments, the refrigeration or air-conditioning apparatus may be a mobile apparatus. As used herein, mobile refrigeration apparatus or mobile air-conditioning apparatus refers to any refrigeration or air-conditioning apparatus incorporated into a transportation unit for the road, rail, sea, or air. In addition, apparatuses meant to provide refrigeration or air-conditioning for a system independent of any moving carrier, known as "intermodal" systems, may also implement the compositions and methods described herein. Such intermodal systems include "containers" (combined sea/land transport) as well as "swap bodies" (combined road and rail transport). The compositions and methods described herein can be useful for road transport refrigerating or air-conditioning apparatus, such as automobile air-conditioning apparatus or refrigerated road transport equipment.

The refrigerant compositions and method as disclosed herein may also be useful in stationary air-conditioning and heat pumps, e.g. chillers, high temperature heat pumps, residential and light commercial and commercial air-conditioning systems. In stationary refrigeration applications, the refrigerant compositions may be useful in equipment such as domestic refrigerators, ice machines, walk-in and reach-in coolers and freezers, and supermarket systems.

The compositions and methods described herein further relate uses as a heat transfer fluid composition. The method comprises transporting the refrigerant composition from a heat source to a heat sink. Heat transfer fluids are utilized to transfer, move or remove heat from one space, location, object or body to a different space, location, object or body by radiation, conduction, or convection. A heat transfer fluid may function as a secondary coolant by providing thermal transfer for cooling (or heating) from a remote refrigeration (or heating) system. In some systems, the heat transfer fluid may remain in a constant state throughout the transfer process (i.e., not evaporate or condense). Alternatively, evaporative cooling processes may utilize heat transfer fluids as well.

A heat source may be defined as any space, location, object or body from which it is desirable to transfer, move or remove heat. Examples of heat sources may be spaces (open or enclosed) requiring refrigeration or cooling, such as refrigerator or freezer cases in a supermarket, building spaces requiring air-conditioning, or the passenger compartment of an automobile requiring air-conditioning. A heat sink may be defined as any space, location, object or body capable of absorbing heat. A vapor compression refrigeration system is one example of such a heat sink.

U.S. Pat. No. 7,914,698 is incorporated by reference herein in its entirety.

The compositions and methods can be applied to various equipment and controls of HVAC systems, including for example chillers including the motors and various compressor types thereof, electronics cooling, bearings, air handlers, purges, evaporators and condensers and the fluid management therein. The compositions and methods can be applied to such equipment in the retrofitting and servicing thereof, as well as in the flammability detection and prevention including sensors and methods of ventilation to reduce the probability of flammable mixtures.

The following respective US patents and US patent application publications illustrate and describe such equipment, controls, and the like with which the compositions and methods herein may be used, and are incorporated by reference in their entireties: US20110100051A1, U.S. Pat. No. 8,613,555B2, US20140360210A1, US20150260441A1, U.rS. Pat. Nos. 7,421,855B2, 8,011,196B2, 8,627,680B2, 7,856,834B2, 4,223,537A, 4,220,011A, US20150034284A1, US20150276282A1, U.S. Pat. Nos. 8,132,420B2, 9,032,754B2, 9,032,753B2, US20140224460A1, US20130075069A1, US20150192371A1, US20150276287A1, US20130283832A1, US20130283830A1, US20140223936A1, US20140102665A1, US20150030490A1, US20150030489A1, U.S. Pat. Nos. 9,022,760B2, 8,875,530B2, 8,454,334B2, 7,819,644B2, US20150093273A1, US20150037186A1, US20150037192A1, US20150037184A1, U.S. Pat. No. 7,556,482B2, US20150247658A1, US20110146317A.

Aspects

Any one or more of aspects 1 to 10 may be combined with any one or more of aspects 11 to 20. Any one or more of aspects 11 to 13 may be combined with any one or more of aspects 14 to 20. Aspect 14 may be combined with any one or more of aspects 15 to 20. Aspect 15 may be combined with any one or more of aspects 16 to 20. Aspect 16 may be combined with any one or more of aspects 17 to 20. Aspect 17 may be combined with any one or more of aspects 18 to 20. Aspect 18 may be combined with any one or more of aspects 19 and 20. Aspect 19 may be combined with aspect 20.

1. A method of reducing flammability of a refrigerant composition in an HVAC system comprising:
    adding a first refrigerant into the composition;
    adding a second refrigerant into the composition; and
    adding an amount of R125 refrigerant into the composition, the R125 refrigerant is relatively less flammable than the first refrigerant and the second refrigerant.

2. The method of aspect 1, wherein the first refrigerant is R32 refrigerant and the second refrigerant is R1234yf refrigerant.

3. The method of aspect 2, wherein the percentage by weight of the R32 refrigerant, the R125 refrigerant, and the R1234yf refrigerant respectively ranges from 64.0 to 69.0, from 6.5 to 7.5, and from 25.5 to 28.5.

4. The method of any one of aspects 1 to 3, wherein the amount of R125 refrigerant ranges from 5.5 percent by weight to 7.5 percent by weight.

5. The method of any one of aspects 1 to 4, wherein the amount of R125 is such that the global warming potential (GWP) of the refrigerant composition is below the GWP of R32 refrigerant.

6. The method of any one of aspects 1 to 5, wherein the refrigerant composition has a GWP of 675 or less.

7. The method of any one of aspects 1 to 6, wherein said adding the first refrigerant comprises adding a refrigerant with a relatively high capacity compared to the second refrigerant and the R125 refrigerant.

8. The method of any one of aspects 1 to 7, wherein said adding the second refrigerant comprises adding a refrigerant with a relatively low GWP compared to the first refrigerant and the R125 refrigerant.

9. The method of any one of aspects 1 to 8, wherein said adding the first refrigerant, the second refrigerant, or the R125 refrigerant comprises adding a refrigerant with a relatively high lubricant solubility compared to the other two refrigerants, and adding a lubricant, the lubricant comprises POE, PVE, polyester, or a combination thereof, thereby improving the lubricant solubility in the HVAC system.

10. A method of reducing flammability of a refrigerant composition in an HVAC system comprising:
    selecting a suitable amount of a non-flammable refrigerant;
    selecting a suitable amount of one or more refrigerants with a relatively low GWP compared to the non-flammable refrigerant, and where the one or more refrigerants is relatively flammable compared to the non-flammable refrigerant; and
    mixing the non-flammable refrigerant and the one or more refrigerants with a relatively low GWP to obtain a resulting refrigerant composition, so as to achieve a desired performance characteristic of the resulting refrigerant composition in a HVAC system, the performance characteristic includes one or more thermodynamic properties of coefficient of performance (COP), capacity (CAP), a discharge temperature (Tdisch), or a combination thereof.

11. A method of retrofitting a refrigerant composition in an HVAC system comprising:
adding an amount of R125 refrigerant to a flammable refrigerant composition.

12. The method of aspect 11, wherein the flammable refrigerant is one of a refrigerant blend of R32 refrigerant and R1234yf refrigerant respectively having a percentage by weight of 72.5 and 27.5, a refrigerant blend of R32 refrigerant and R1234yf refrigerant respectively having a percentage by weight of 68.9 and 31.1, or a refrigerant blend of R32 refrigerant and R1234yf refrigerant respectively having a percentage by weight of 36 and 64.

13. The method of aspect 11 or 12, further comprising replacing an existing flammable refrigerant composition of the HVAC system with the composition resulting from adding the amount of R125 refrigerant to the flammable refrigerant composition.

14. A method of servicing an HVAC system comprising:
adding an amount of R125 refrigerant to a flammable refrigerant composition.

15. A method of improving safety in an HVAC system comprising:
adding an amount of R125 refrigerant to a flammable refrigerant composition.

16. An HVAC system comprising an operational refrigerant composition, the refrigerant composition includes R32 refrigerant, R125 refrigerant, and R1234yf refrigerant, the percentage by weight of the R32 refrigerant, the R125 refrigerant, and the R1234yf refrigerant respectively ranges from 64.0 to 69.0, from 6.5 to 7.5, and from 25.5 to 28.5.

17. A method of recycling R410A refrigerant from a HVAC system, comprising:
removing existing R410A refrigerant from the HVAC system; and
adding a refrigerant composition to the HVAC system, the refrigerant composition including R32 refrigerant, R125 refrigerant, and R1234yf refrigerant, the percentage by weight of the R32 refrigerant, the R125 refrigerant, and the R1234yf refrigerant respectively ranges from 64.0 to 69.0, from 6.5 to 7.5, and from 25.5 to 28.5.

18. A method of making a refrigerant composition, comprising:
selecting a suitable amount of a first refrigerant to address flammability of the refrigerant composition,
selecting a suitable amount of a second refrigerant to address GWP of the refrigerant composition;
selecting a suitable amount of a third refrigerant to address capacity of the refrigerant composition; and
mixing the first, second, and third refrigerant.

19. A method of improving safety of an HVAC system, comprising:
selecting a suitable amount of a first refrigerant to address flammability of the refrigerant composition;
selecting a suitable amount of a second refrigerant to address GWP of the refrigerant composition;
selecting a suitable amount of a third refrigerant to address capacity of the refrigerant composition; and
mixing the first, second, and third refrigerant.

20. A method of controlling flammability of a refrigerant composition in an HVAC system, comprising:
selecting a suitable amount of a first refrigerant to address flammability of the refrigerant composition;
selecting a suitable amount of a second refrigerant to address GWP of the refrigerant composition;
selecting a suitable amount of a third refrigerant to address capacity of the refrigerant composition; and
mixing the first, second, and third refrigerant.

With regard to the foregoing description, it is to be understood that changes may be made in detail, without departing from the scope of the compositions and methods described herein. It is intended that the specification and depicted embodiments are to be considered exemplary only, with a true scope and spirit of the compositions and methods being indicated by the broad meaning of the claims.

The invention claimed is:

1. A method of reducing flammability of a refrigerant composition in a heating, ventilation, and air conditioning (HVAC) system, comprising:
adding R32 refrigerant into the composition;
adding R1234yf refrigerant into the composition; and
adding an amount of R125 refrigerant into the composition, the R125 refrigerant is relatively less flammable than the R32 refrigerant and the R1234yf refrigerant, wherein the amount of R125 refrigerant is 5.5% by weight, 6.5% by weight, 7.5% by weight, or from 10.5% to 20% by weight, and wherein the percentage by weight of the R32 refrigerant and the R1234yf refrigerant respectively ranges from 64.0 to 69.0 and from 25.5 to 28.5.

2. The method of claim 1, wherein the amount of the R125 refrigerant is such that a global warming potential (GWP) of the refrigerant composition is below a GWP of the R32 refrigerant.

3. The method of claim 1, wherein the refrigerant composition has a global warming potential (GWP) of 675 or less.

4. The method of claim 1, wherein the R32 refrigerant has a relatively higher capacity than the R1234yf refrigerant and the R125 refrigerant.

5. The method of claim 1, wherein the R1234yf refrigerant has a relatively lower global warming potential (GWP) than the R32 refrigerant and the R125 refrigerant.

6. The method of claim 1, wherein the R32 refrigerant, the R1234yf refrigerant, or the R125 refrigerant has a relatively higher lubricant solubility than the other two refrigerants, and adding a lubricant, the lubricant comprises polyol ester (POE), polyvinyl ether (PVE), polyester, or a combination thereof.

7. A method of retrofitting a refrigerant composition in a heating, ventilation, and air conditioning (HVAC) system, comprising:
adding an amount of R125 refrigerant to a flammable refrigerant composition, wherein the flammable refrigerant is a refrigerant blend of R32 refrigerant and R1234yf refrigerant respectively having a percentage by weight of 64.0 to 69.0 and 25.5 to 28.5, and
wherein the amount of R125 refrigerant is 5.5% wt, 6.5% wt, 7.5% wt, or 10.5% to 20% wt.

8. The method of claim 7, further comprising replacing an existing flammable refrigerant composition of the HVAC system with the composition resulting from adding the amount of R125 refrigerant to the flammable refrigerant composition.

9. A heating, ventilation, and air conditioning (HVAC) system comprising an operational refrigerant composition, the refrigerant composition includes R32 refrigerant, R125 refrigerant, and R1234yf refrigerant, the percentage by weight of the R32 refrigerant and the R1234yf refrigerant respectively ranges from 64.0 to 69.0 and from 25.5 to 28.5, and the percentage by weight of the R125 refrigerant is 5.5, 6.5, 7.5, or from 10.5 to 20.

10. A method of recycling R410A refrigerant from a heating, ventilation, and air conditioning (HVAC) system, comprising:
   removing existing R410A refrigerant from the HVAC system; and
   adding a refrigerant composition to the HVAC system, the refrigerant composition including R32 refrigerant, R125 refrigerant, and R1234yf refrigerant, the percentage by weight of the R32 refrigerant and the R1234yf refrigerant respectively ranges from 64.0 to 69.0 and from 25.5 to 28.5, and the percentage by weight of the R125 refrigerant is 5.5, 6.5, 7.5, or from 10.5 to 20.

* * * * *